United States Patent
Kremenetsky et al.

(10) Patent No.: US 11,888,763 B2
(45) Date of Patent: Jan. 30, 2024

(54) SYSTEMS, METHODS, AND DEVICES FOR REPLACEABLE ELEMENTS WITHIN NETWORK SWITCHES

(71) Applicant: MELLANOX TECHNOLOGIES, LTD., Yokneam (IL)

(72) Inventors: Alex Kremenetsky, Kiriat Bialik (IL); Adi Berman, Yokneam Illit (IL); Shy Zimmerman, Kibutz Magal (IL); Igor Loiferman, Yokneam Illit (IL); Avi Gibbs, Rehovot (IL); Samer Khoury, Nazareth Illit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 98 days.

(21) Appl. No.: 17/484,106

(22) Filed: Sep. 24, 2021

(65) Prior Publication Data

US 2023/0109006 A1 Apr. 6, 2023

(51) Int. Cl.
*H04L 49/00* (2022.01)
*H04L 49/45* (2022.01)
*H04L 12/46* (2006.01)

(52) U.S. Cl.
CPC .............. *H04L 49/70* (2013.01); *H04L 12/46* (2013.01); *H04L 49/45* (2013.01)

(58) Field of Classification Search
CPC .......... H04L 49/70; H04L 12/46; H04L 49/45
See application file for complete search history.

(56) References Cited

U.S. PATENT DOCUMENTS

| | | | | |
|---|---|---|---|---|
| 2002/0186123 | A1* | 12/2002 | Kivisto | G08B 1/08 340/286.07 |
| 2004/0164826 | A1* | 8/2004 | Okumura | B60R 21/01554 335/220 |
| 2010/0241387 | A1* | 9/2010 | Ignatian | G01F 25/11 702/100 |
| 2010/0254652 | A1* | 10/2010 | Kirkpatrick | H04Q 11/0005 398/45 |
| 2013/0292233 | A1* | 11/2013 | Arif | B65G 21/02 198/837 |
| 2017/0293584 | A1* | 10/2017 | Satheesh | G06F 13/4022 |
| 2020/0146180 | A1* | 5/2020 | Thubert | G06F 1/263 |
| 2020/0329288 | A1* | 10/2020 | Minkenberg | H04Q 11/0005 |
| 2021/0118777 | A1* | 4/2021 | Antonello | H01L 23/3736 |
| 2022/0091703 | A1* | 3/2022 | Vo | H04L 41/145 |

* cited by examiner

*Primary Examiner* — Christine Ng

(74) *Attorney, Agent, or Firm* — Sheridan Ross P.C.

(57) ABSTRACT

A spine switch for a network switch comprises a support board that supports at least one first switch. The spine switch further includes a first set of connectors at a first edge of the support board that detachably connect to one or more first leaf switches to communicatively couple and decouple the at least one first switch from the one or more first leaf switches.

20 Claims, 22 Drawing Sheets

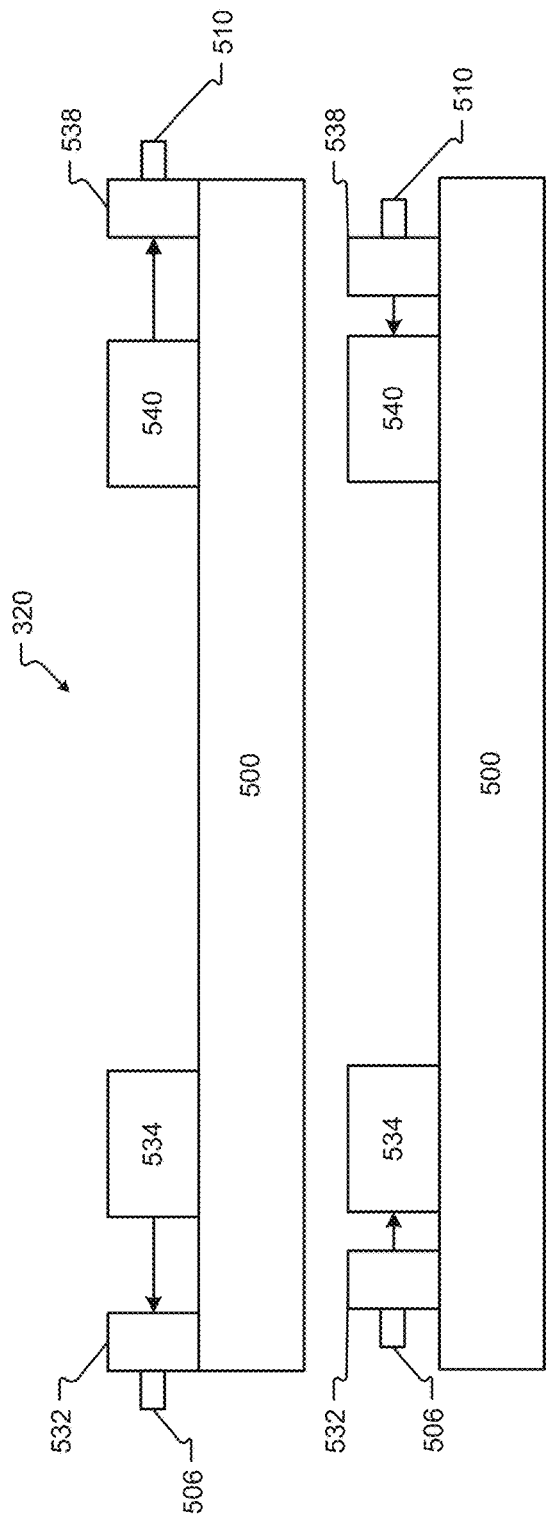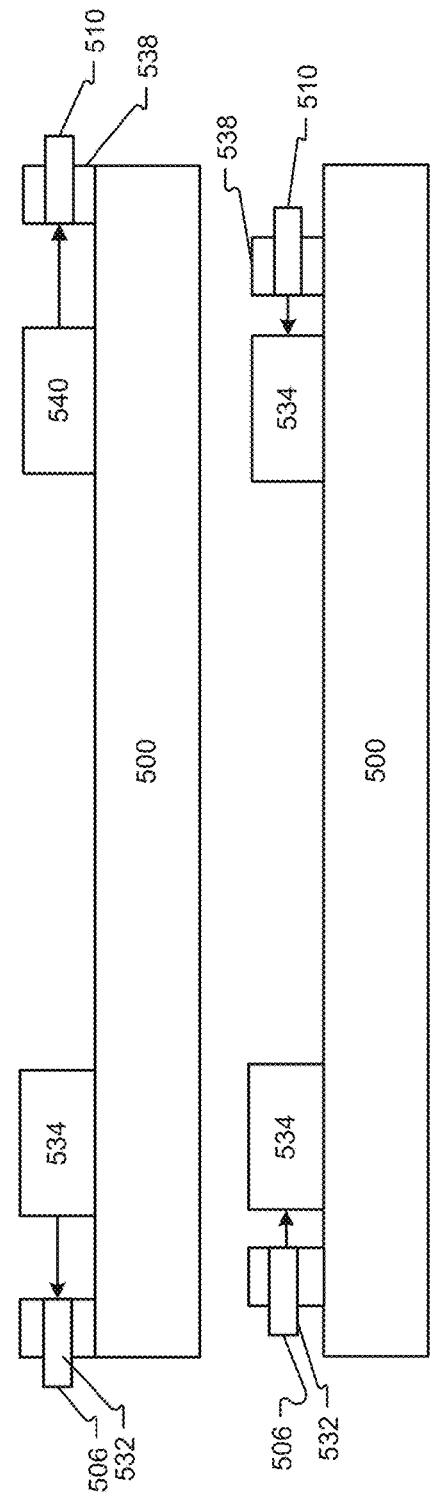

SYSTEMS, METHODS, AND DEVICES FOR REPLACEABLE ELEMENTS WITHIN NETWORK SWITCHES

FIELD OF THE DISCLOSURE

The present disclosure is generally directed to systems, methods, and devices for replaceable elements within network switches.

BACKGROUND

Network switches are used in networking systems, like datacenters, for routing data between endpoints. Faulty elements within a network switch (e.g., a faulty switching application specific integrated circuit (ASIC) in a director switch) may require a tedious, costly, and/or time consuming maintenance effort that involves powering down the entire network switch, disconnecting cables to remove the faulty element, installing a replacement element, and reconnecting the cables before the network switch is operable again.

BRIEF SUMMARY

In an illustrative embodiment, a spine switch for a network switch comprises a support board that supports at least one first switch; and a first set of connectors at a first edge of the support board that detachably connect to one or more first leaf switches to communicatively couple and decouple the at least one first switch from the one or more first leaf switches.

In at least one embodiment, the support board is removable from the network switch.

In at least one embodiment, the spine switch further comprises a first rail arranged along the first edge of the support board and protruding from a surface of the support board, the first set of connectors being attached to the first rail, the first rail being movable to enable disconnection of the first set of connectors from the one or more first leaf switches and removal of the support board from the network switch.

In at least one embodiment, the spine switch further comprises at least one mechanism that causes movement of the first rail.

In at least one embodiment, the at least one mechanism comprises a jack mechanism on the support board and that mechanically couples to the first rail.

In at least one embodiment, the at least one mechanism comprises a rod that mechanically couples to the jack mechanism and that causes movement of the jack mechanism upon rotation of the rod.

In at least one embodiment, upon coupling the rod to the jack mechanism, the rod extends to a second edge of the support board, the second edge of the support board extending in a different direction than the first edge of the support board.

In at least one embodiment, an end of the rod at the second edge of the support board enables mechanical coupling to a tool used to rotate the rod.

In at least one embodiment, the spine switch further comprises one or more flexible cables that pass signals between the first set of connectors and the at least one first switch.

In at least one embodiment, the one or more flexible cables have lengths that enable movement of the first rail without disconnecting the one or more flexible cables from the first set of connectors and the at least one first switch.

In at least one embodiment, the spine switch further comprises a second set of connectors at a second edge of the support board that detachably connect to one or more second leaf switches to communicatively couple and decouple the at least one first switch from the one or more second leaf switches.

In at least one embodiment, a number of the first set of connectors, a number of the second set of connectors, and a number of ports of the at least one first switch are such that the spine switch is non-blocking.

In at least one embodiment, the spine switch further comprises a second rail arranged along the second edge of the support board and protruding from the surface of the support board, the second set of connectors being attached to the second rail, the second rail being movable to enable disconnection of the second set of connectors from the one or more second leaf switches and removal of the support board from the network switch.

In at least one embodiment, the at least one mechanism comprises a first mechanism that moves the first rail and a second mechanism that moves the second rail.

In an illustrative embodiment, an assembly for a network switch comprises a rack; and a spine section including one or more spine switches. At least one of the one or more spine switches includes a support board that is attachable to the rack and that supports at least one first switch; and a first set of connectors at a first edge of the support board that detachably connect to one or more first leaf switches to communicatively couple and decouple the at least one first switch from the one or more first leaf switches.

In at least one embodiment, the assembly further comprises a first leaf section including the one or more first leaf switches, each first leaf switch including a plurality of connectors, where each connector in the plurality of connectors of each first leaf switch detachably connects to a different spine switch in the one or more spine switches through a connector in the first set of connectors of each spine switch.

In at least one embodiment, when the one or more spine switches are positioned in the rack and are connected to the one or more first leaf switches, a longitudinal axis of each spine switch extends in a first direction and a longitudinal axis of each first leaf switch extends in a second direction that is substantially perpendicular to the first direction.

In at least one embodiment, each support board further comprises a second set of connectors at a second edge of the support board that detachably connect to one or more second leaf switches to communicatively couple and decouple the at least one first switch from the one or more second leaf switches.

In at least one embodiment, the assembly further comprises a second leaf section including the one or more second leaf switches, each second leaf switch including a plurality of connectors, where each connector in the plurality of connectors of each second leaf switch detachably connects to a different spine switch in the one or more spine switches through a connector in the second set of connectors of each spine switch. Each support board further comprises a first movable support rail having the first set of connectors attached thereto; a second movable support rail having the second set of connectors attached thereto; one or more flexible first cables that pass signals between the at least one first switch and the first set of connectors; and one or more flexible second cables that pass signals between the at least one first switch and the second set of connectors.

In at least one embodiment, a leaf switch for a network switch comprises a support board that supports at least one switch; a first interface at a first edge of the support board and that connects to devices external to the network switch; and a second interface at a second edge of the support board and including a plurality of connectors, each connector enabling a detachable connection to a single spine switch of a plurality of spine switches of the network switch, the second edge of the support board being opposite the first edge of the support board.

It should be appreciated that inventive concepts cover any embodiment in combination with any one or more other embodiments, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Additional features and advantages are described herein and will be apparent from the following description and the figures.

BRIEF DESCRIPTION OF THE DRAWINGS

The present disclosure is described in conjunction with the appended figures, which are not necessarily drawn to scale:

FIGS. 5A to 5I illustrate various views for showing additional details of a spine switch from FIG. 3 according to at least one example embodiment.

DETAILED DESCRIPTION

Figure 1:
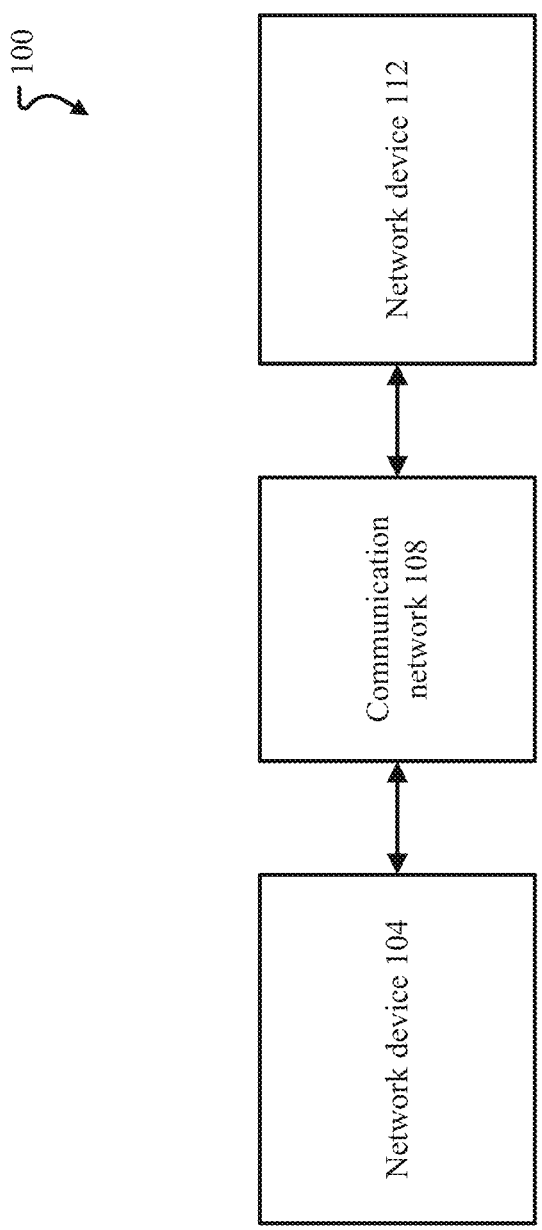
FIG. 1 illustrates a block diagram of a networking system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Inventive concepts relate to mid-plane integration inside a network switch, for example, a director switch. Connections within a director switch may use a mid-plane implemented with cables. The purpose of the mid-plane is to allow connectivity between the ports of the director switch. The serviceability of the mid-plane in some director switches is limited due to its location and major role. Any maintenance replacement or malfunction repair activity takes down the whole director switch or a large portion of its ports, for example, by disconnecting sections of the datacenter connected by the director switch (e.g., 600 to 800 nodes each).

Inventive concepts relate to integrating the mid-plane functionality with replaceable units (customer replaceable units (CRUs)), which minimizes or reduces the influence of failure.

Integrating mid-plane functionality with a CRU enables one to split a full-size midplane to smaller elements, thus reducing the influence of a failure to a certain portion of the links provided by the director switch—rather than whole switch shut-down as in related art director switches.

By integrating the mid-plane functionality within multiple replaceable units (CRUs), it is possible to reduce or minimize the influence of failure to certain unit and its connectivity only, instead of turning off the whole system. As discussed in more detail below, example embodiments propose an innovative topology of "spine in the middle" instead of "mid-plane in the middle." Inventive concepts eliminates the need for a midplane design that involves cumbersome cabling. Inventive concepts further reduce system mechanical dimensions and risks of critical "mid-plane" failure. In one embodiment, a switch includes 32 customer replaceable vertically oriented leaf switches with 16 rear connectors on each leaf switch. Leaf switches are located on both opposite sides of the spine switches. In addition, there may be 32 user accessible ports located on the front panel of each leaf switch. Any port can be connected to any rear connector, which allows full & unblocking bidirectional bandwidth per port.

A spine switch according to example embodiments may include 16 customer replaceable horizontally oriented spines with 16 connectors on each of its sides. The spine switches may be "collapsible" in order to reduce each unit's width for insertion\extraction, and "expandable" in order to connect to the leaf switches after insertion of the spine switches. The method to move the connectors of the spine switch can be either electrical (like step motor) or mechanical (like using screw or gear sets, to convert rotary motion into linear motion) or other. The movement of the connectors on the spine switch is possible by utilizing flexibility of the wires between the PCB's and the connectors. In at least one embodiment, the connectivity scheme between leaf switches and spine switches allows 100% connectivity (any port to any other port).

FIG. 1 illustrates a system 100 according to at least one example embodiment. The system 100 includes a network device 104, a communication network 108, and a network device 112. In at least one example embodiment, network devices 104 and 112 may correspond a network switch (e.g., an Ethernet switch), a collection of network switches, a network interface controller (NIC), or any other suitable device used to control the flow of data between devices connected to communication network 108. Each network device 104 and 112 may be connected to one or more of Personal Computer (PC), a laptop, a tablet, a smartphone, a server, a collection of servers, or the like. In one specific, but non-limiting example, each network device 104 and 112 includes multiple network switches in a fixed configuration or in a modular configuration.

Examples of the communication network 108 that may be used to connect the network devices 104 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables communication between the network devices 104 and 112 using Ethernet technology. In one specific, but non-limiting example, the network devices 104 and 112 correspond to director switches that may have a modular configuration. As discussed in more detail below, a network switch (e.g., a director switch) according to inventive concepts may implement multiple layers of a network topology as field replaceable units (FRUs) or customer replaceable units (CRUs) within a single chassis.

Although not explicitly shown, the network device 104 and/or the network device 112 may include storage devices and/or processing circuitry for carrying out computing tasks, for example, tasks associated with controlling the flow of data within each network device 104 and 112 and/or over the communication network 108. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on a Printed Circuit Board (PCB) or collection of PCBs. It should be appreciated that any appropriate type of electrical component or collection of electrical components may be suitable for inclusion in the processing circuitry.

In addition, although not explicitly shown, it should be appreciated that the network devices 104 and 112 include one or more communication interfaces for facilitating wired and/or wireless communication between one another and other unillustrated elements of the system 100.

Figure 2:
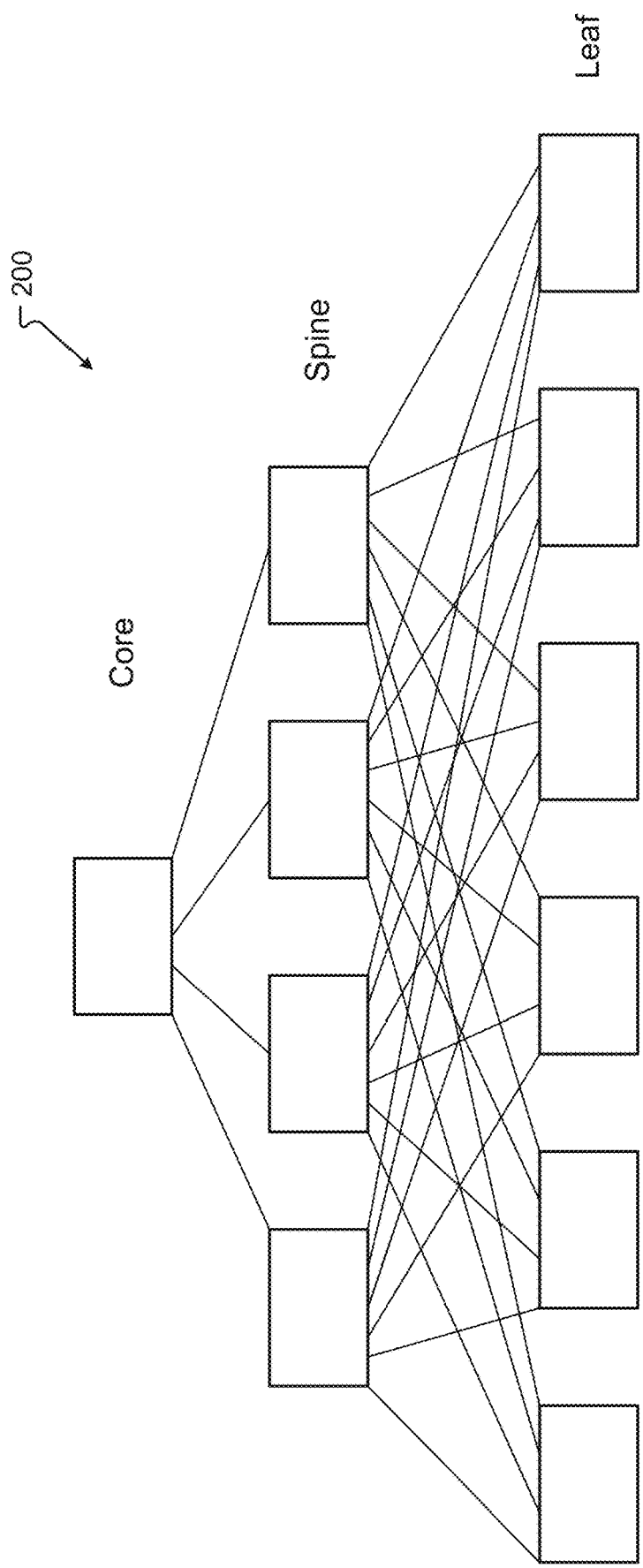
FIG. 2 illustrates a networking topology according to at least one example embodiment.

FIG. 2 illustrates a networking topology 200 according to at least one example embodiment. The topology 200 is a three tier topology with core, spine (or aggregation), and leaf (or access) layers. Each box of each layer represents a collection of network switches that is repeated for that layer. Although not explicitly shown, endpoints that comprise servers and/or user terminals may be connected to the leaf layer. Here, it should be appreciated that example embodiments are not limited to the topology 200, and inventive concepts may be applied to other suitable network topologies (e.g., a two tier topology with spine and leaf layers). As discussed in more detail below, example embodiments relate to a network switch capable of implementing multiple network layers with switches that are customer replaceable, thereby simplifying maintenance operations and reducing down-time of the network switch while under maintenance.

Figure 3:
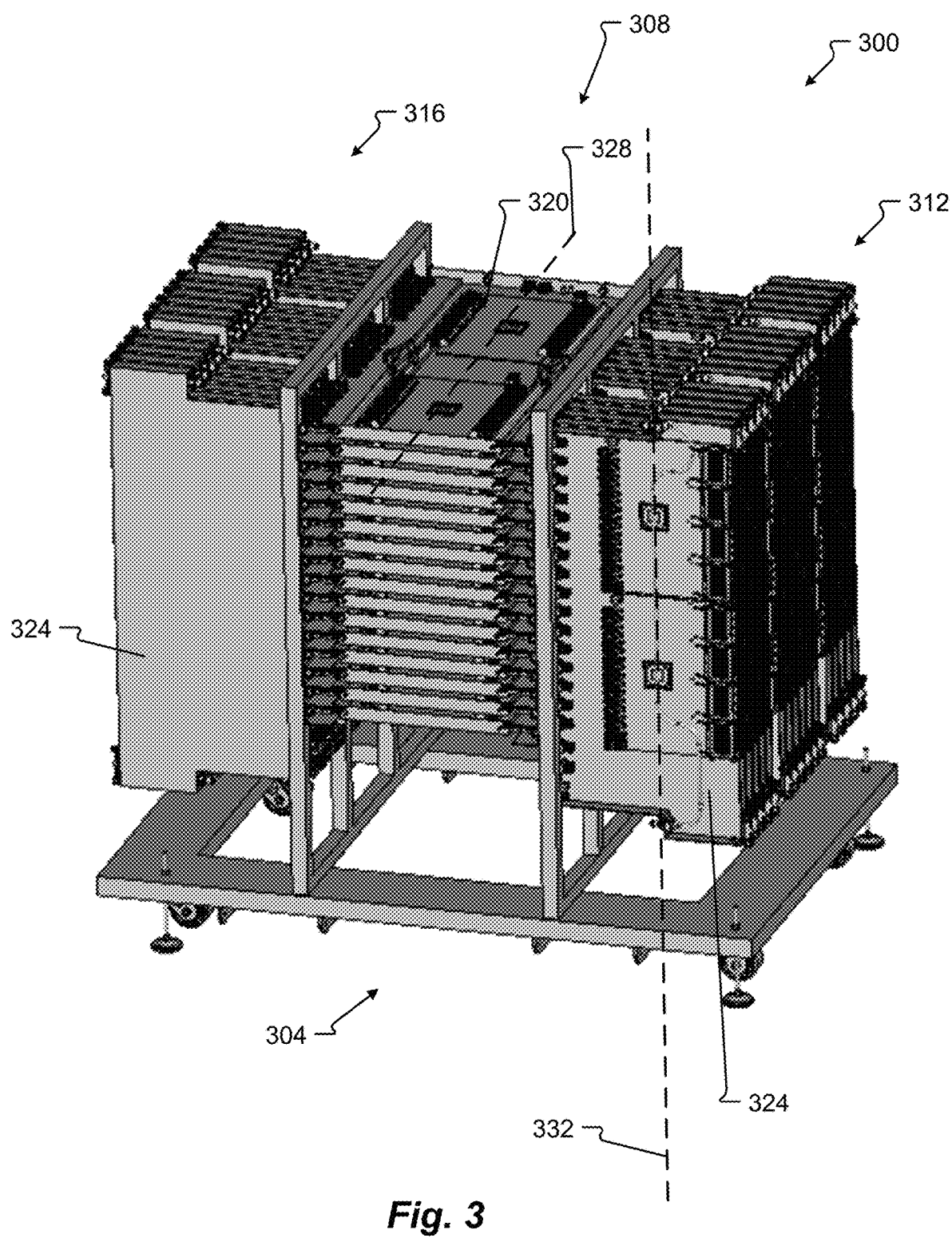
FIG. 3 illustrates a network switch according to at least one example embodiment.

FIG. 3 illustrates a network switch 300 according to at least one example embodiment. The network switch 300 may have a director switch configuration and may include a rack 304, a spine section 308, a first leaf section 312, and a second leaf section 316. As discussed in more detail below, the spine section 308 may include one or more spine switches 320 mounted in the rack 304 while each leaf section 312 and 316 may include one or more leaf switches 324 detachably connected to the one or more spine switches 320. As may be appreciated, spine switches 320 provide electrical and/or optical connections between one or more leaf switches 324 of the first leaf section 312 and one or more leaf switches 324 of the second leaf section 316 so that signals can be routed from one leaf section to the other leaf section over the spine section 308. Although not explicitly shown in FIG. 3, outer interfaces of each leaf switch 324 may be connectable to external devices within a network system (e.g., servers, other network switches, user terminals, and/or the like). The network devices 104 and/or 112 from FIG. 1 may be implemented with the network switch 300 or at least part of the network switch 300. In at least one example embodiment, the spine section 308 corresponds to one or more boxes within the spine layer in FIG. 2 while the leaf sections 312 and/or 316 correspond to one or more boxes within the leaf layer in FIG. 2. The ensuing description of various figures sets forth additional structural and functional details about the elements that comprise the network switch 300 (e.g., the spine switches 320 and the leaf switches 324).

Figure 4A:
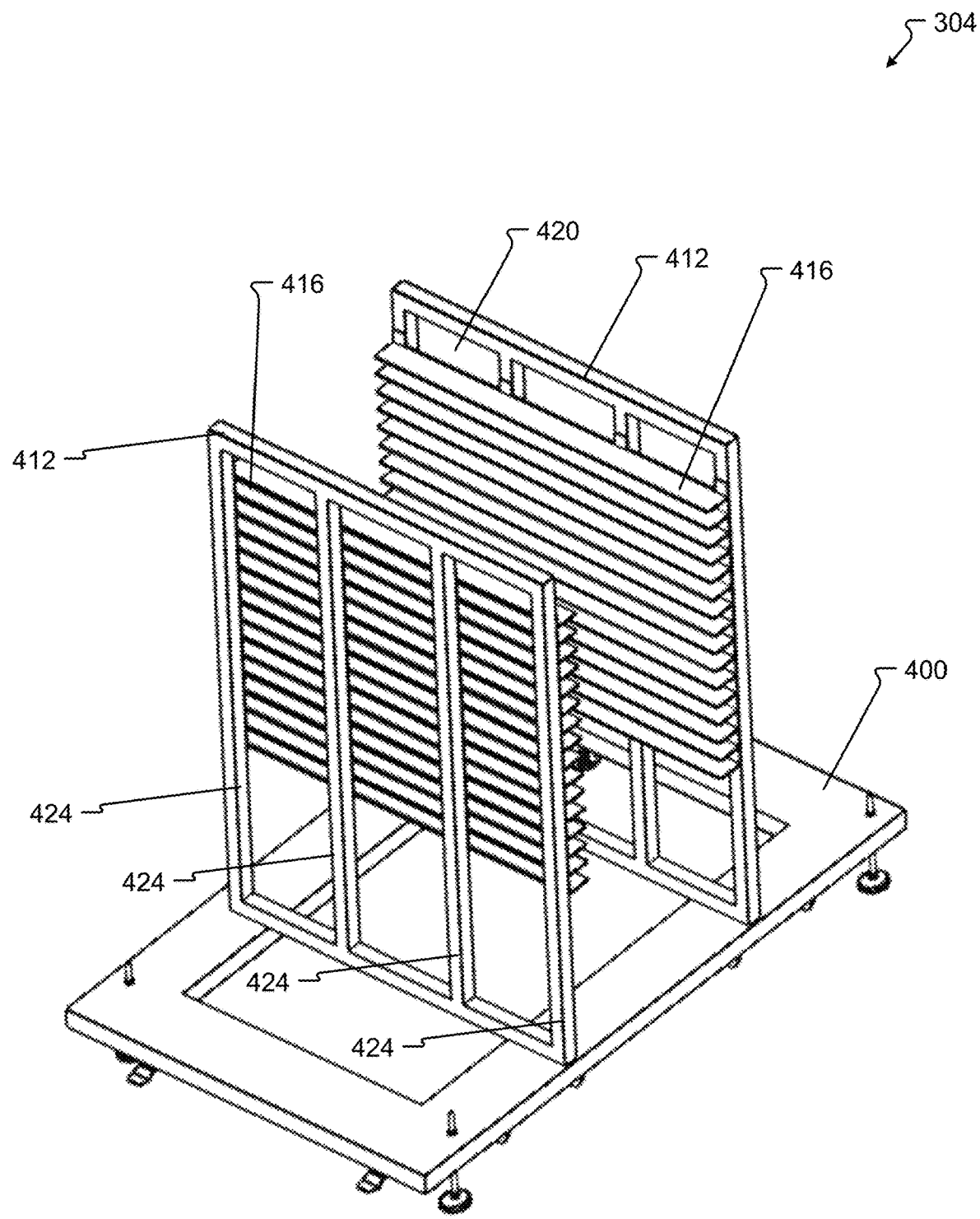
FIGS. 4A to 4D illustrate various views for showing additional details of the rack from FIG. 3 according to at least one example embodiment.
Figure 4B:
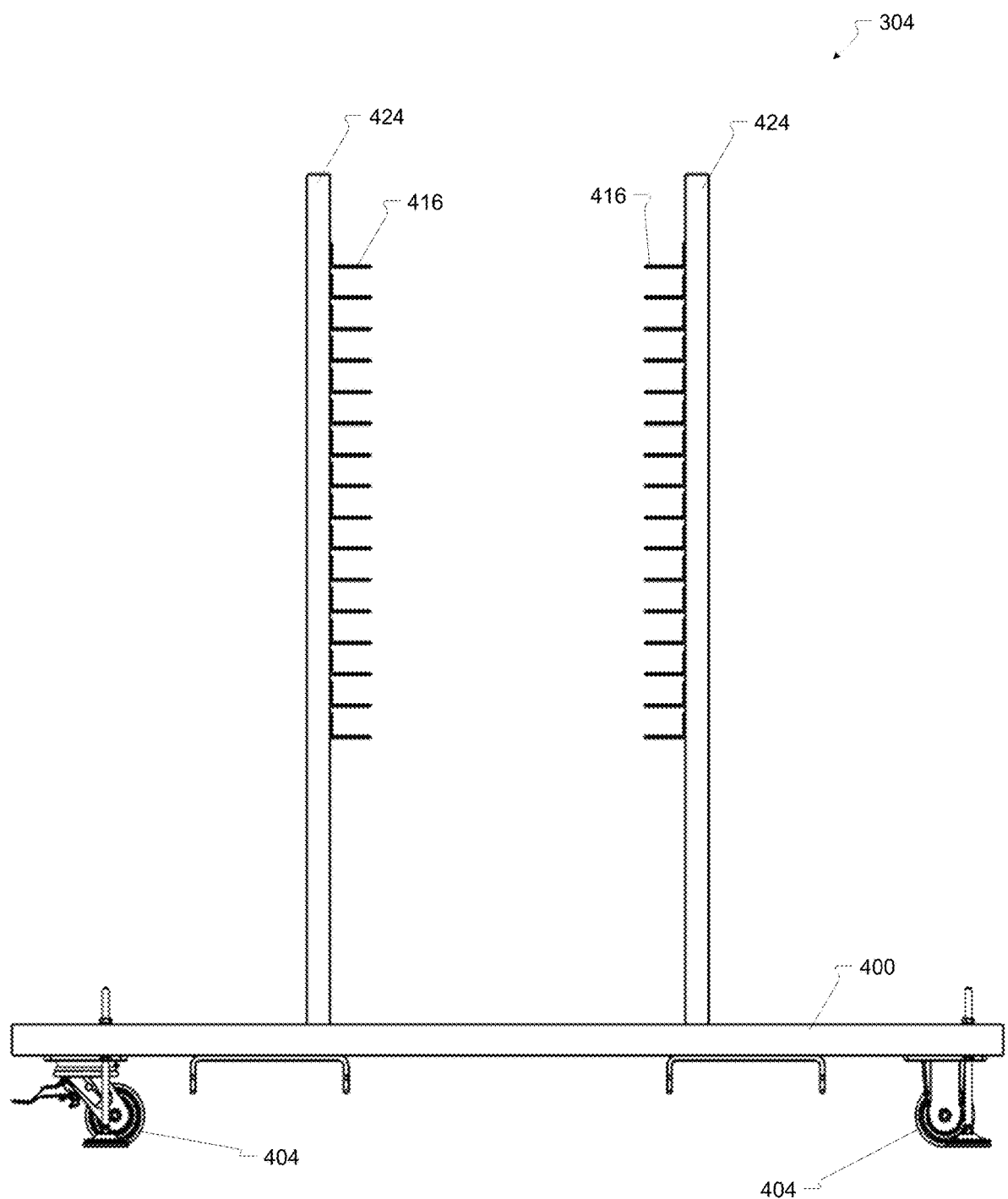
Figure 4C:
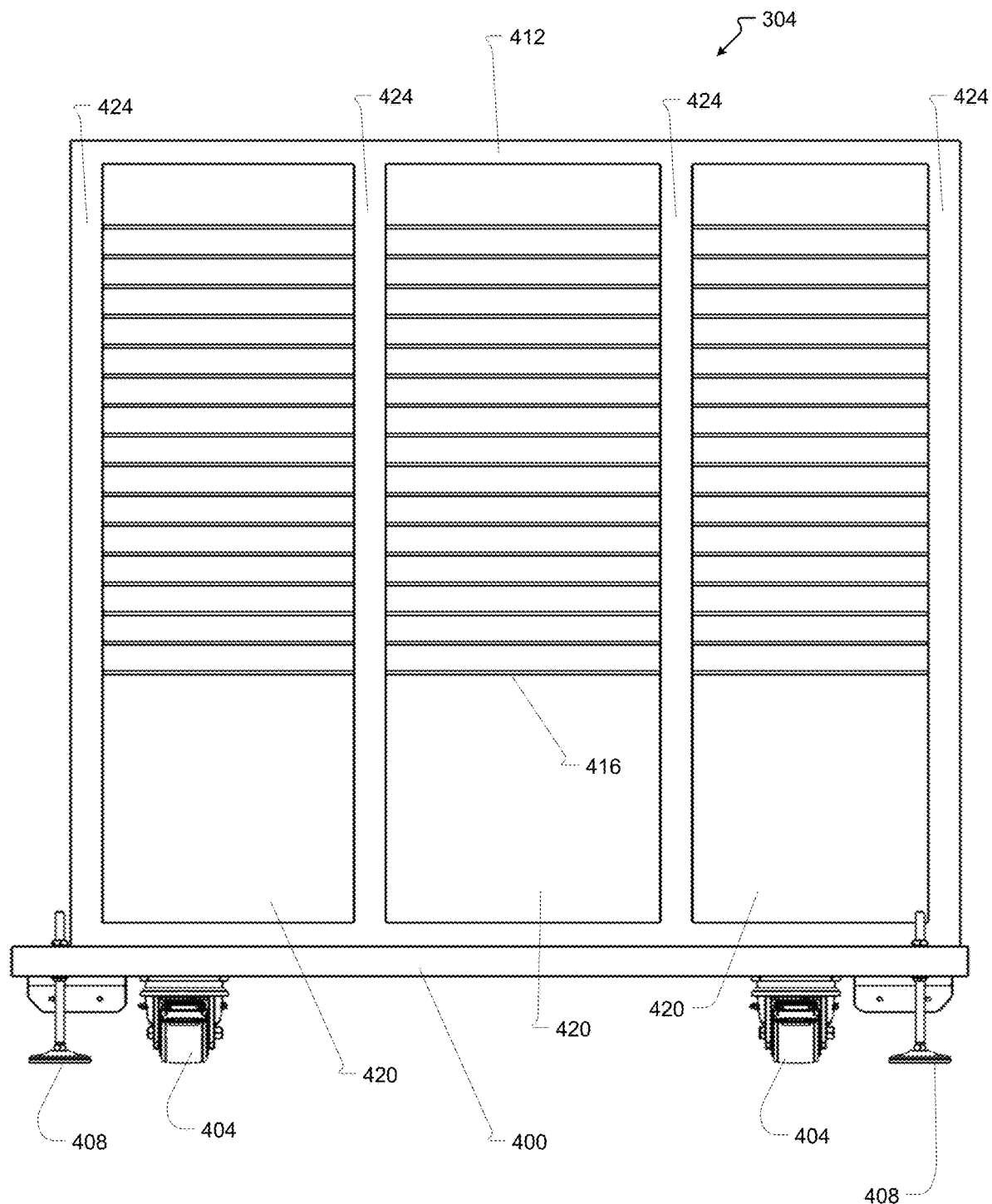
Figure 4D:
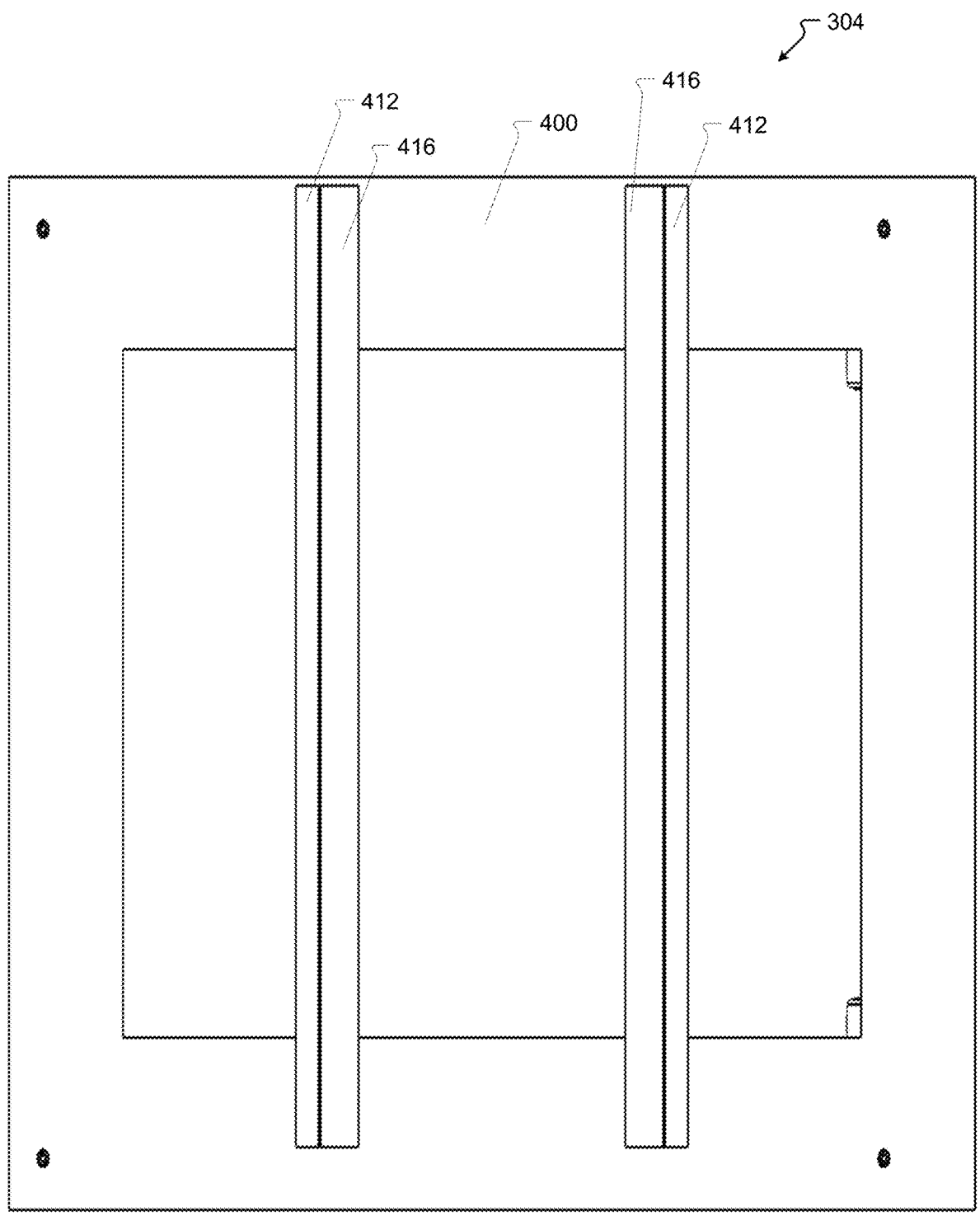

FIGS. 4A to 4D illustrate various views for showing additional details of the rack 304 from FIG. 3 according to at least one example embodiment. In more detail, FIG. 4A illustrates a perspective view of the rack 304, FIG. 4B illustrates an end view of the rack 304, FIG. 4C illustrates a side view of the rack 304, and FIG. 4D illustrates a top view of the rack 304.

With reference to FIGS. 4A to 4D, the rack 304 includes a rectangular base 400, wheels 404, adjustable stoppers 408, rectangular side supports 412, and L-shaped mounting rails 416. A bottom side of the base 400 includes wheels 404 to allow movement of the rack 304. The bottom side of the base 400 further includes adjustable stoppers 408 that may be moved downward to be in contact with a ground surface to prevent the rack 304 from moving once wheeled into position.

A top side of the base 400 supports the two side supports 412 arranged in parallel with one another. Each side support 412 may include one or more openings 420 formed between vertical cross rails 424 and each opening 420 is sized to accommodate a number of the leaf switches 324 of an assembled network switch 300. FIGS. 4A to 4D illustrate that each side support 412 includes three openings 420 with each opening 420 accommodating a suitable number of leaf switches 324. For example, FIG. 3 illustrates that the middle openings 420 of each side support 412 accommodate six leaf switches 324 while openings 420 on either end of the middle opening 420 each accommodate five leaf switches so that a total of 16 leaf switches 324 are possible to install in each leaf section 312 and 316.

Each side support 412 includes one or more mounting rails 416. FIGS. 4A to 4D illustrate an example that includes 16 mounting rails 416 on each side support 412. As shown in the end view of the rack 304 in FIG. 4B, for example, each mounting rail 416 on one side support 412 has a corresponding and horizontally aligned mounting rail 416 on the other side support 412 so that the pair of horizontally aligned mounting rails 416 are capable of supporting a spine switch 320 in a substantially level plane. Here, it should be appreciated that although the mounting rails 416 are illustrated as being solid and uniform structures from end to end, example embodiments are not limited thereto. In at least one example embodiment, each mounting rail 416 may be formed in separate sections that are mounted to one or more of the vertically arranged cross rails 424 of the side supports 412 that create the openings 420 (e.g., each of the four vertically arranged rails 424 of a side support 412 has an L-shaped bracket mounted thereto). In at least one other embodiment, the part of each mounting rail 416 mounted to the side support 412 may include openings that correspond to the connectors of a spine switch 320 and/or openings that correspond to openings 420. In this case, the bottom of the mounting rail 416 may be once piece of solid material that travels from one end of a side support 412 to the other end of the side support 412.

Here, it should be appreciated that FIGS. 4A to 4D illustrate one example of a rack 304 and that various details of the rack 304 may be altered according to design preferences. For example, the dimensions, shapes, and/or number of elements described above as being associated with the rack 304 may change depending on design preferences.

Figure 5A:
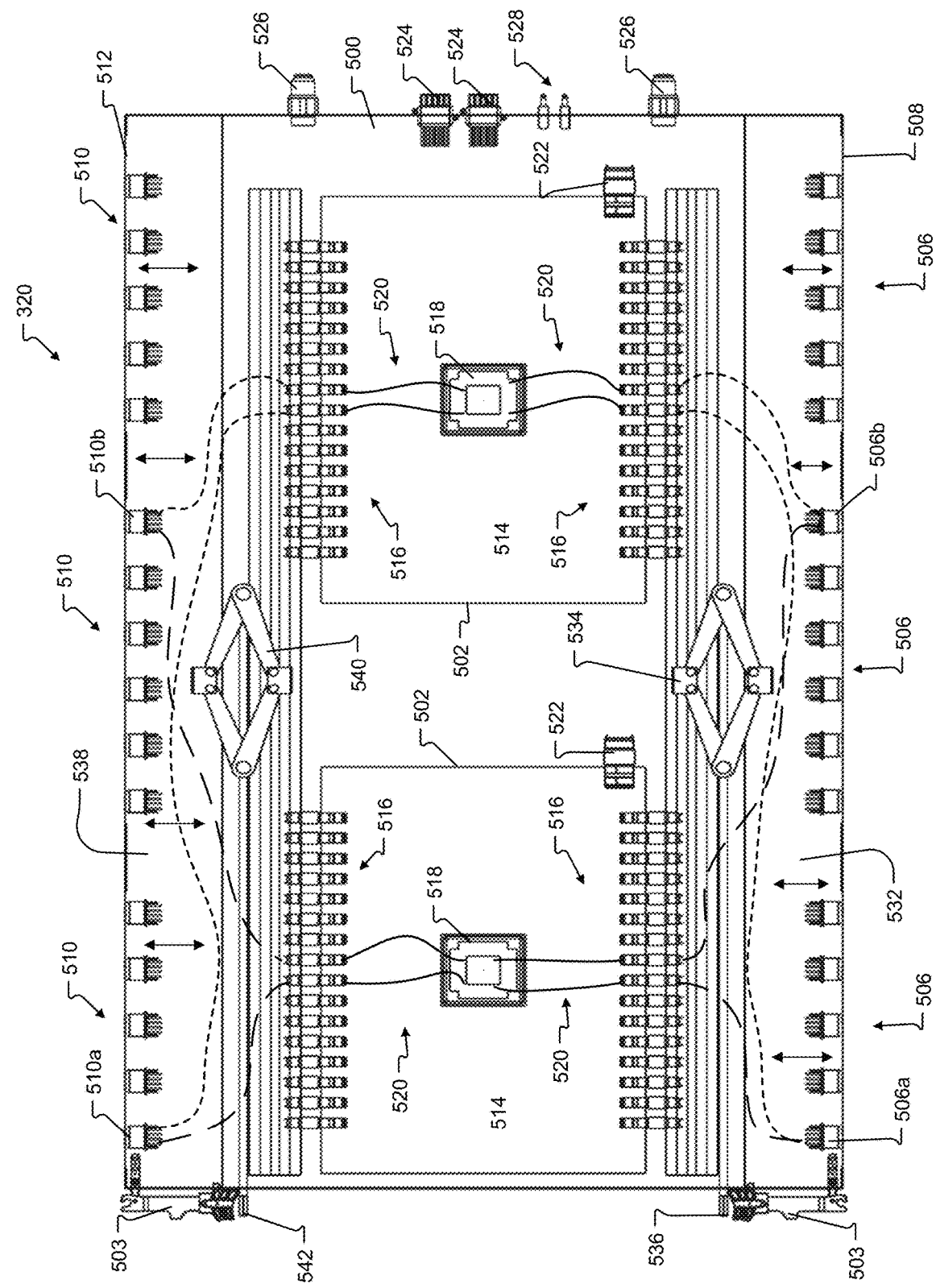
Figure 5B:
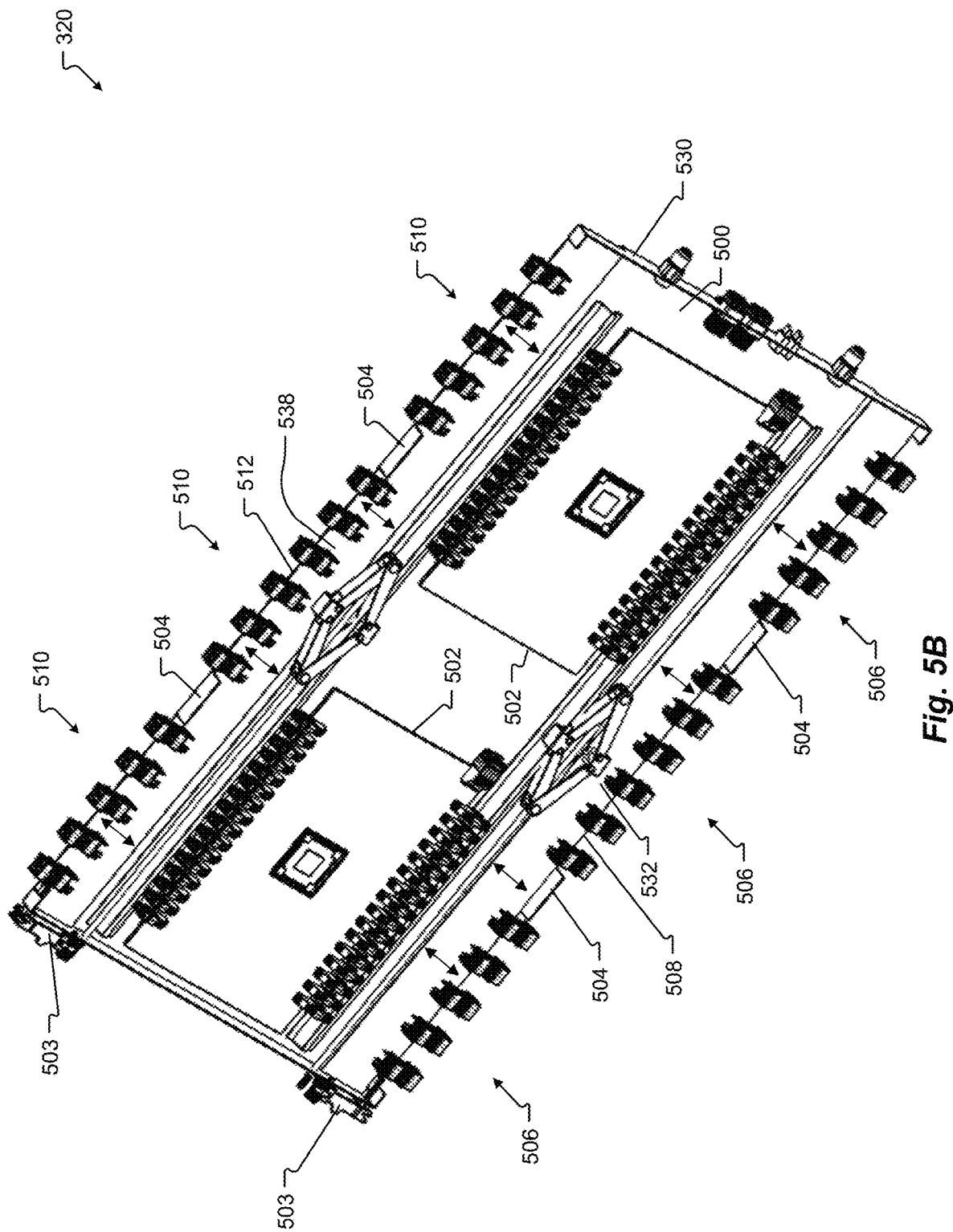
Figure 5E:
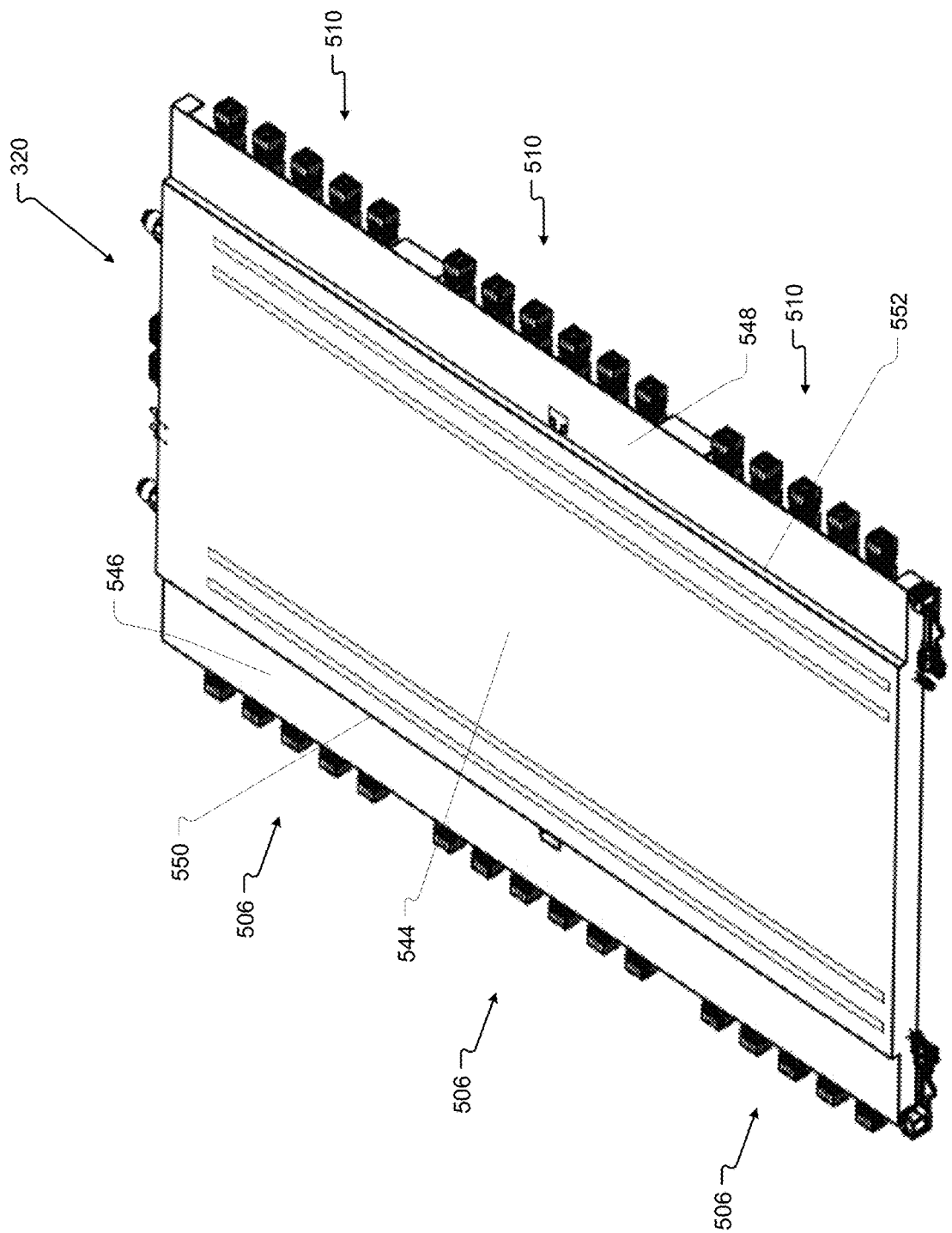
Figure 5F:
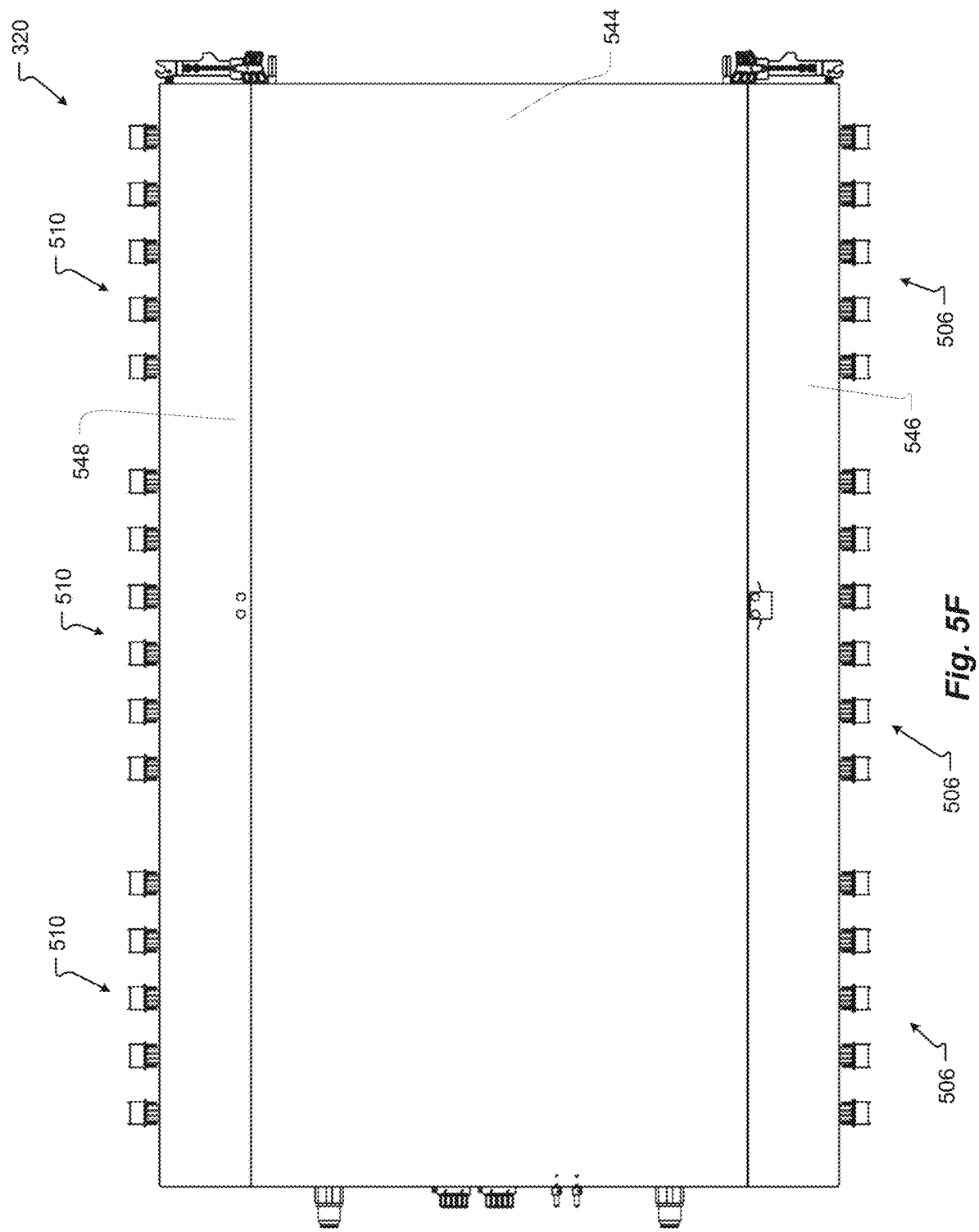
Figure 5G:
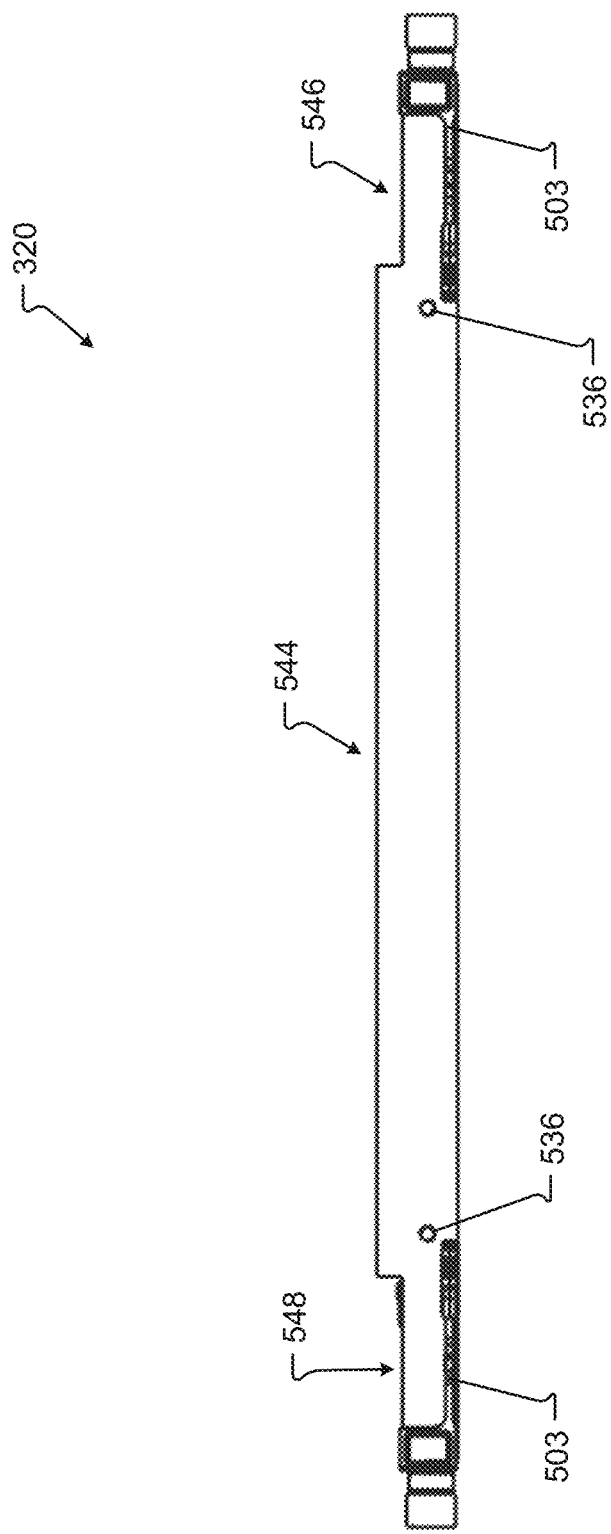
Figure 5H:
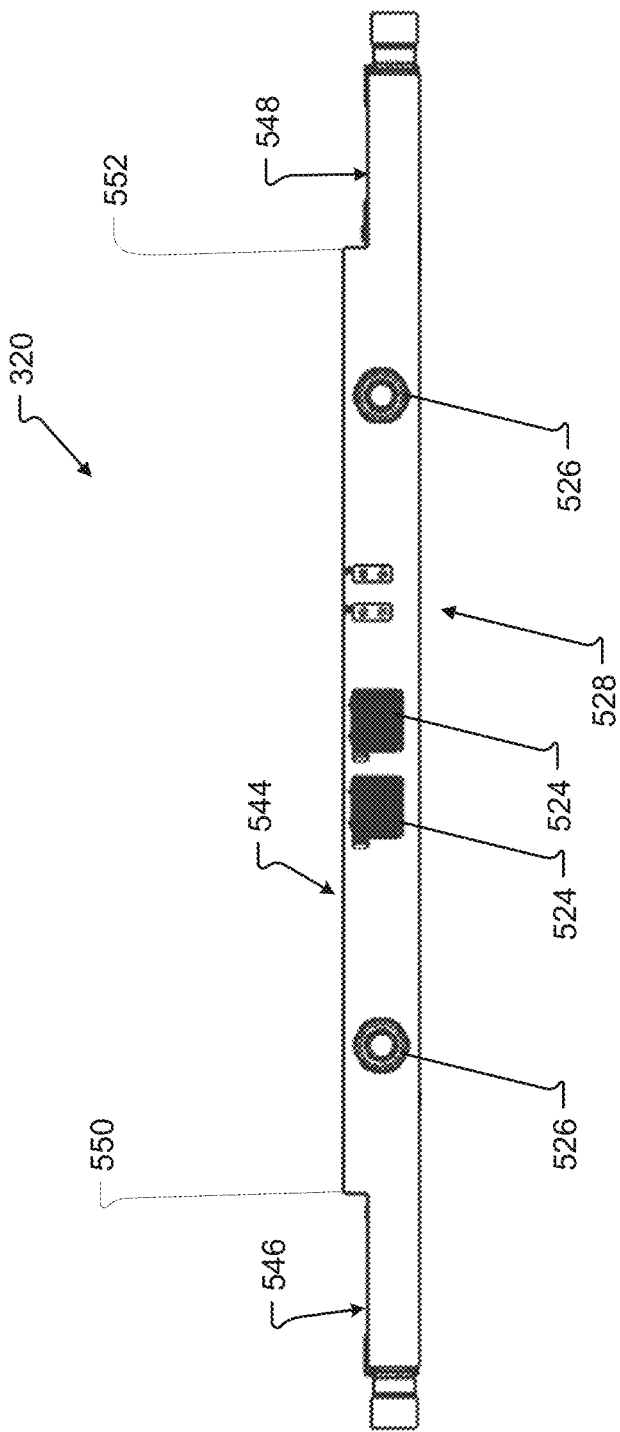
Figure 5I:
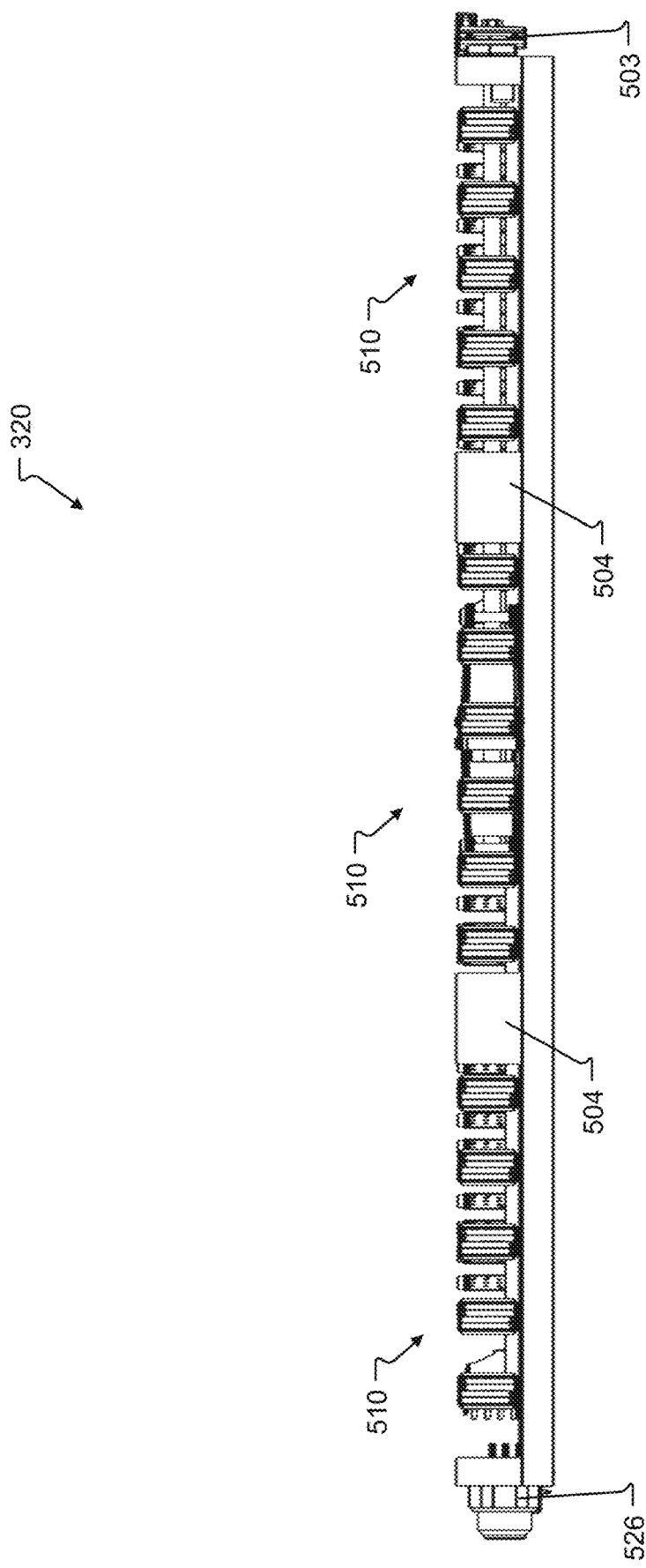

FIGS. 5A to 5I illustrate various views for showing additional details of a spine switch 320 from FIG. 3 according to at least one example embodiment. In more detail, FIG. 5A illustrates a top plan view of a spine switch 320, FIG. 5B illustrates a top perspective view of a spine switch 320, FIGS. 5C and 5D illustrate block diagrams of a mechanism that causes movement of connectors of a spine switch 320, FIG. 5E illustrates a back view of a spine switch 320, FIG. 5F illustrates a back perspective view of a spine switch 320, FIG. 5G illustrates an end view of a spine switch 320, FIG. 5G illustrates another end view of the spine switch 320, and FIG. 5I illustrates a side view of a spine switch 320. For ease of illustration, it should be appreciated that some of the views in FIGS. 5A to 5I may exclude one or more elements shown in at least one other view.

With reference to FIGS. 5A to 5I, a spine switch 320 includes a support board 500 that supports at least one first switch 502. FIG. 5A, for example, illustrates that the support board 500 supports two switches 502. The support board 500 may comprise any suitable material on which the elements shown in FIGS. 5A to 5I can be mounted or otherwise attached. For example, the support board 500 may comprise a non-conductive substrate, such as the same or similar substrate used for printed circuit boards (PCBs). The support board 500 may be rigid or partially flexible and be sized to fit into the rack 304 to enable mounting or insertion of the board 500 to the rack 304 with the aid of mounting rails 416. Notably, the support board 500 is removable from the rack 304 of the network switch 300.

In at least one embodiment, the support board 500 is mounted to or otherwise held in the rack 304 in a manner that enables easy removal of the board 500 from the rack 304. For example, one end of the support board 500 includes mechanisms, such as clips 503, that engage with corresponding mechanisms on the rack 304 to enable a user to lock the board 500 into place within the rack 304. The clips 503 may be operated by a user to unlock the board 500 from the rack 304 to enable removal of the board 500 from the rack 304. Example embodiments are not limited to using clips 503 and other suitable mechanisms for manually locking and unlocking the board 500 may be employed.

In at least one other example, the support board 500 includes brackets 504 that protrude from a surface of the board 500 and that are located on the board 500 at locations that correspond to the cross rails 424. The brackets 504 may be semi-flexible and set to angle outward from edges of the board 500 so that inserting the board 500 into the rack 304 causes a friction-fit between the brackets 504 and mounting rails 416 and/or side supports 512. In this case, upon insertion of the board 500 into the rack 304, the brackets 504 are bent inward toward an edge of the support board 500 so that the friction between the brackets 504 and the mounting rails 416 holds the board 500 in place.

In at least one other embodiment, the brackets 504 may be mounted to the cross rails 424 and/or the mounting rails 416 in any suitable manner (e.g., with screws, detent connections, and/or the like). In any event, the brackets 504 may disengage from the cross rails 424 and/or the mounting rails 416 to enable removal of the board 500.

Example embodiments are not limited to the connections described above for holding a support board 500 within a rack 304 and other suitable connections may be employed.

Still with reference to FIGS. 5A to 5I, a spine switch 320 may further include a first set of connectors 506 at a first edge 508 of the support board 500 that detachably connect to one or more first leaf switches 324 to communicatively couple and decouple the at least one first switch 502 from the one or more first leaf switches 324. As also shown, the spine switch 320 may further comprise a second set of connectors 510 at a second edge 512 of the support board 500 that detachably connect to one or more second leaf switches 324 to communicatively couple and decouple the at least one first switch 502 from the one or more second leaf switches 324. In at least one example embodiment, a number of the first set of connectors 506, a number of the second set of connectors 510, and a number of ports 516 of the at least one first switch 502 are such that the spine switch 320 is non-blocking. In the example of FIGS. 5A to 5I, there are 16 connectors in the first and second sets of connectors 506 and 510 and 32 ports for each switch 502 (16 ports on each side of the switch 502).

Each switch 502 may comprise a substrate, for example, a PCB 514, and input/output ports 516 on either side of the PCB 514. For example, each side of the PCB 514 may have an equal number of input/output ports 516. Each switch 502 may further comprise a switching device 518 for routing electrical and/or optical signals from the ports 516 on one side of the switch 502 to the ports 516 on the other side of the switch 502. The switching device 518 is illustrated in FIGS. 5A to 5I as an electrical switching ASIC for routing electrical signals. However, example embodiments are not limited thereto and the switching device 518 may additionally or alternatively comprise an optical switch for routing optical signals. The PCB 514 may further comprise connections 520 that connect ports 516 of a switch 502 to the switching device 518 of the switch 502. The connections 520 may comprise conductive traces on the PCB 514 and/or waveguides on the PCB depending on whether the switching device 518 is an electrical switching ASIC that receives electrical signals over the conductive traces or an optical switch that receives optical signals over the waveguides.

Each switch 502 may further include a connector 522 that connects with a cable (not shown) that leads to a connector 524. The connectors 522 and 524 and cables may carry signals that provide a selected function for a respective switch 502. For example, the connectors 522 and 524 and the cables may provide management functions to a respective switch 502 to manage the spine switch 320 with an internal and/or external server. Such management functions may include debug and/or testing operations for a switch 502 (e.g., the connectors 522 and 524 enable operation of each switch 502 as a standalone unit during manufacturing and assembly of a spine switch 320 to run debugging operations and/or tests).

A spine switch 320 may further comprise ports 526 at one end of the support board 500. The ports 526 may connect to internal and external cooling tubes (not shown) that carry a liquid coolant. The internal cooling tube may be arranged on the support board 500 to provide cooling functions for the switches 502 (e.g., for the switching devices 518). One of the ports 526 serves as an inlet for coolant while the other of the ports 526 serves as an outlet for the coolant. The internal cooling tube may be arranged over the support board 500 in the same or similar manner as that shown for the leaf switch 324 in FIG. 6A.

The spine switch 320 may further include main power connectors 528 for connecting a power source to each switch 502 (one connector 528 for each switch 502). The connectors 528 may blind mate with a female connector inside the rack 304 or connect to an external power cord.

The connectors 524, ports 526, and pins 528 may be inserted through corresponding openings in a faceplate 530 attached to the board 500 or the rack 304 (see FIG. 5B).

As noted above, a spine switch 320 according to example embodiments may be easily removed from the rack 304 and replaced with a new spine switch 320. At least some of the features that relate to the removable and replaceable nature of a spine switch 320 are described in more detail below.

Still with reference to FIGS. 5A to 5I, a spine switch 320 may include a substantially planar first rail 532 arranged along the first edge 508 of the support board 500 on a surface of the support board 500. As shown, the first set of connectors 506 are attached to the first rail 532 (e.g., attached to a top surface of rail 532). In accordance with example embodiments, the first rail 532 is movable to enable removal of the support board 500 from the network switch 300 (inward and outward movement of rail 532 shown in FIGS. 5A and 5B with two-way arrows). For example, moving the first rail 532 inward toward a center of the board 500 may disconnect of the first set of connectors 506 from (connectors of) the one or more first leaf switches 324.

The spine switch 320 includes at least one mechanism that causes movement of the first rail 532. The least one mechanism may comprise a jack mechanism (or jack) 534 on the support board 500 and that mechanically couples to the first rail 532. For example, the jack 534 includes one part that is fixed to the support board 500 and another part that is fixed to the rail 532 to enable inward and outward movement of the rail 532 relative to the board 500. The at least one mechanism may further comprise a rod 536 that mechanically couples to the jack mechanism 534 and that causes translational movement of the jack mechanism 534 upon rotation of the rod 536. As shown in FIG. 5A, for example, upon coupling the rod 536 to the jack mechanism 534, the rod 536 extends to and protrudes from an end or edge of the support board 500. The end or edge of the support board 500 from which the rod 536 protrudes may extend in a different direction than the edge 508 of the support board 500. In at least one embodiment, an end of the rod 536 that protrudes from the end of the support board 500 enables mechanical coupling to a tool used to rotate the rod 536. The tool may be a crank that enables manual rotation of the rod 536 by a user. Additionally or alternatively, the rod 536 may be mechanically coupled to an electric motor that rotates the rod 536 upon activation of the motor by a user.

As further shown in FIGS. 5A to 5I, the spine switch 320 may include a substantially planar second rail 538 arranged along the second edge 512 of the support board 500. As shown, the second set of connectors 510 are attached to the second rail 538, for example, in the same or similar manner as the connectors 506 are attached to the first rail 532. Like the first rail 532, the second rail 538 is movable to enable and removal of the support board 500 from the network switch 300. For example, moving the second rail 538 disconnects of the second set of connectors 510 from one or more second leaf switches 324. In an embodiment with two rails 532 and 538, the at least one mechanism comprises the mechanism that moves the first rail 532 and another mechanism that moves the second rail 538. The mechanism that moves the second rail 538 may correspond to another jack 540 and rod 542 that are operable in the same or similar manner as the jack 534 and rod 536.

Here, it should be appreciated that although FIGS. 5A to 5I show two rails 532 and 538 and two sets of mechanisms for moving the rails 534/536 and 540/542, it should be appreciated that only one rail and one mechanism for moving that rail may be used. In this case, the single movable rail should have a range of movement that enables disconnection of the connectors (e.g., 506) on one edge of the spine switch 320 from connectors of one or more leaf switches 324 and that also enables a user to slide the board 500 in a lateral direction to disconnect the connectors (e.g., 510) of the spine switch 320 on the other side of the board 500. Upon disconnection of both sets of connectors 506 and 510 from respective leaf switches 324 in leaf sections 312 and 318, the board 500 may be removed from the rack 304.

A spine switch 320 may further include one or more flexible cables that pass signals between the sets of connectors 506 and 510 and the switch(es) 502. For example, a set of flexible cables in FIG. 5A represented with dashed lines connect ports 516 of switches 502 to respective connectors 506a, 506b, 510a, and 510b. The one or more flexible cables pass electrical signals and/or optical signals depending upon the implementation of the switch 502. In addition, the one or more flexible cables have lengths that enable movement of the rails 532 and/or 538 without disconnecting the one or more flexible cables from the sets of connectors 506 and/or 510 and the switches 502. In other words, the flexible cables that connect each set of connectors 506 and 510 to ports 516 of the switches 502 may move or flex as the rails 532 and/or 538 move under force applied by jack 534 and/or jack 540, and the cables have enough slack and ability to bend so that the connections are maintained between connectors 506 and 510 and corresponding ports 516 during and after the movement of the rails 532 and 538.

As noted above, FIGS. 5A and 5B illustrate an example where connectors 506 are mounted to a top surface of a substantially planar rail 532 and where connectors 510 are mounted to a top surface of a substantially planar rail 538. Then, the planar rails 532 and 538 are movable by respective jacks 534 and 540 so that the connectors 506 and 510 retract inward and extend outward with their respective rails. FIGS. 5C and 5D, however, are block diagrams from an end view perspective (or, alternatively, a cross sectional view perspective) of a spine switch 320 and illustrate alternative designs for the rails 532 and 538 and connectors 506 and 510. As shown in FIGS. 5C and 5D, for example, each rail 532 and 538 may protrude from the top surface of the support board 500. In FIG. 5C, the connectors 506 and 510 are attached or fixed to outer sidewalls of the rails 532 and 538. Meanwhile, in FIG. 5D, the connectors 506 and 510 are penetrate through the rails 532 and 538 and protrude from the outer sidewalls of the rails 532 and 538. Each of FIGS. 5C and 5D shows the rails 532 and 538 in an extended state (top part of each figure) and in a retracted state (bottom part of each figure). In any event, the rails 532 and 538 may have other suitable shapes or forms while the connectors 506 and 510 may be affixed or otherwise mechanically coupled to respective rails 532 and 538 in other suitable manners.

FIGS. 5E and 5F illustrate back views of the spine switch 320. The back side of the spine switch 320 includes a main surface 544 and two surfaces 546 and 548 on either side of the main surface 544 that are stepped-back from the main surface 544 by respective steps 550 and 552. The surfaces 546 and 548 may make contact with mounting rails 416 upon installation of the spine switch 320 into the rack 304. Thus, the surfaces 546 and 548 may have widths that are at least as wide as the portion of the mounting rail 416 that contacts the surfaces 546 and 548 to enable the spine switch 320 to become seated within the rack 304. The widths of the surfaces 546 and 548 may be the same or different. As shown in the end views of FIGS. 5G and 5H, the surfaces 544, 546, and 548 are substantially planar and surfaces of the steps 550 and 552 are substantially perpendicular to the surfaces 544, 546, and 548.

FIG. 5I illustrates a side view of the spine switch 320, which illustrates, among other things that a height of each bracket 504 may be substantially equal to height of a connector 510 (and connector 506).

Although not explicitly shown, it should be appreciated that the spine switch 320 may include a cover that covers the components on the board 500. The cover may have substantially the same size and shape as the board 500.

Here, it should be appreciated that FIGS. 5A to 5I illustrate an example implementation of a spine switch 320 and that various details of the spine switch 320 may be altered according to design preferences. For example, the dimensions of elements, shapes of elements, and/or number elements (e.g., of connectors and input/output ports) described above as being associated with the spine switch 320 may change depending on design preferences. For example, fewer or more switches 502 may be included. In general, though, the spine switch 320 according to inventive concepts has at least one moveable set of connectors that connect to a leaf switch 324 so that the spine switch 320 is a field replaceable or customer replaceable unit.

Figure 6A:
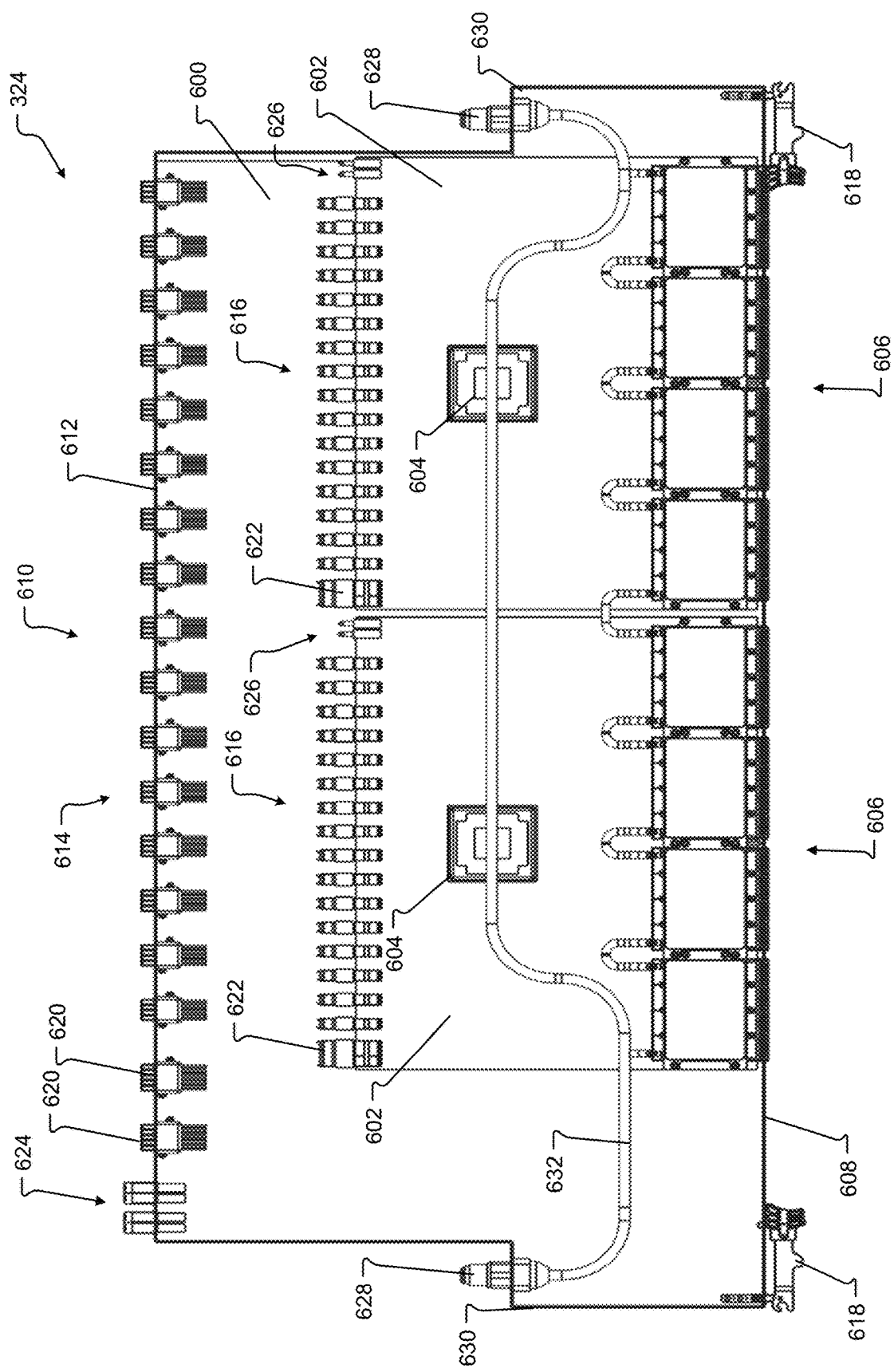
FIGS. 6A to 6G illustrate various views for showing additional details of a leaf switch according to at least one example embodiment.
Figure 6B:
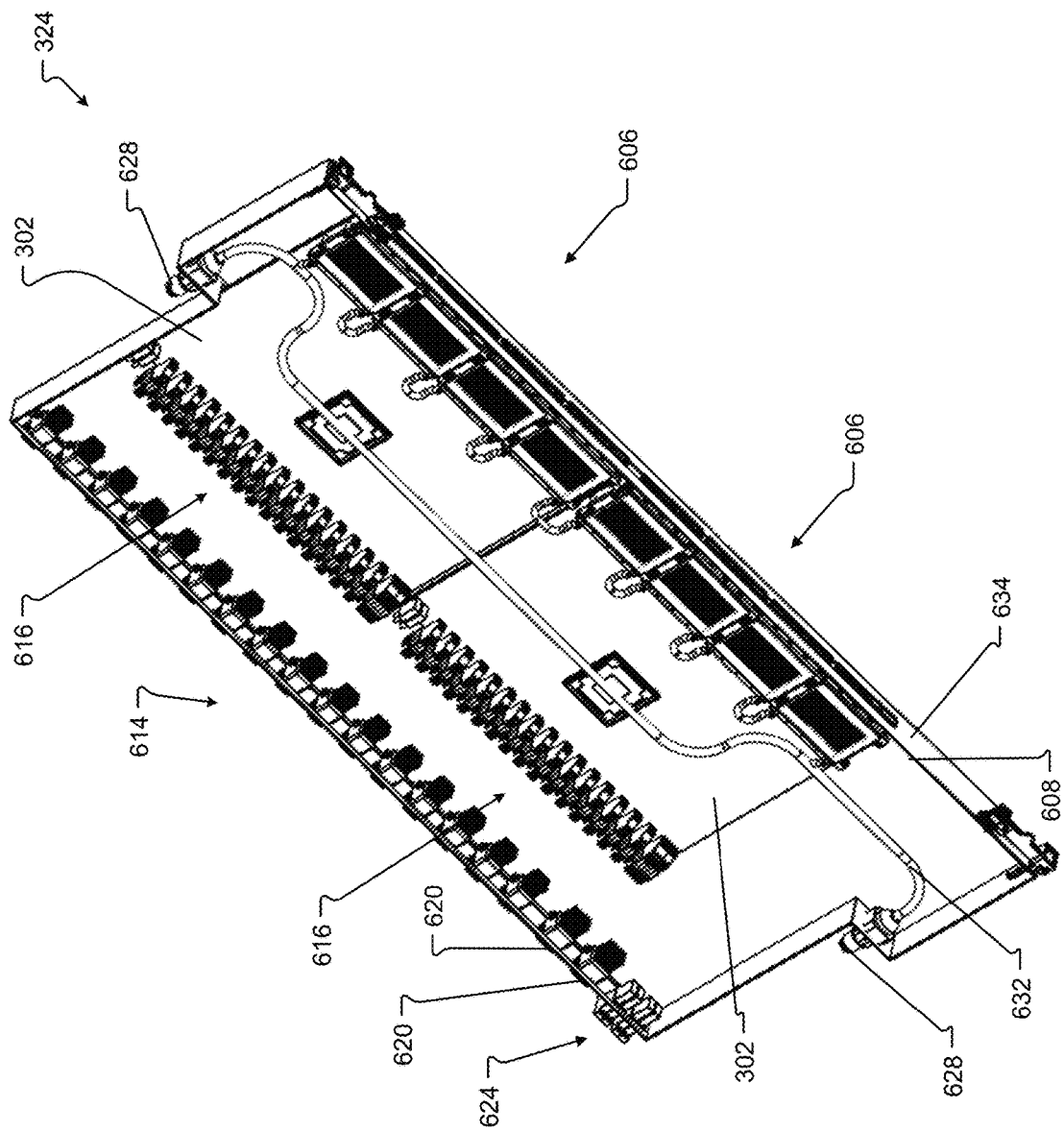
Figure 6C:
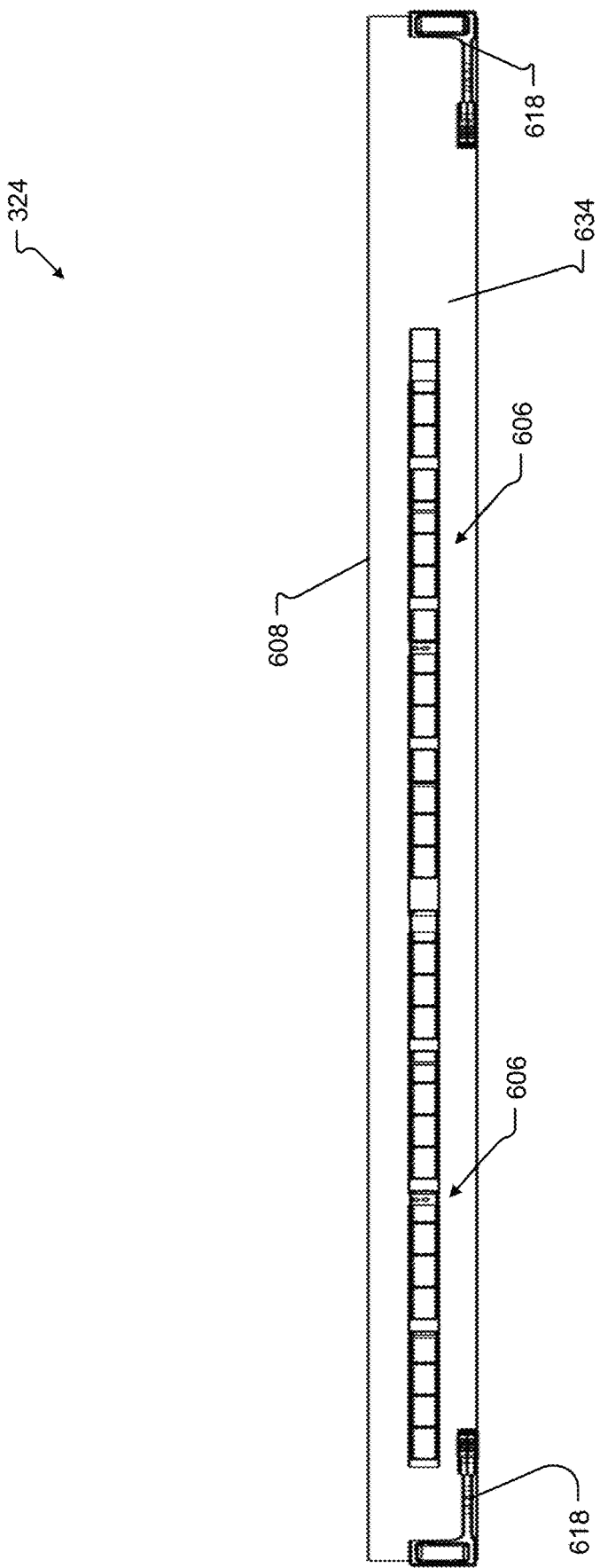
Figure 6D:
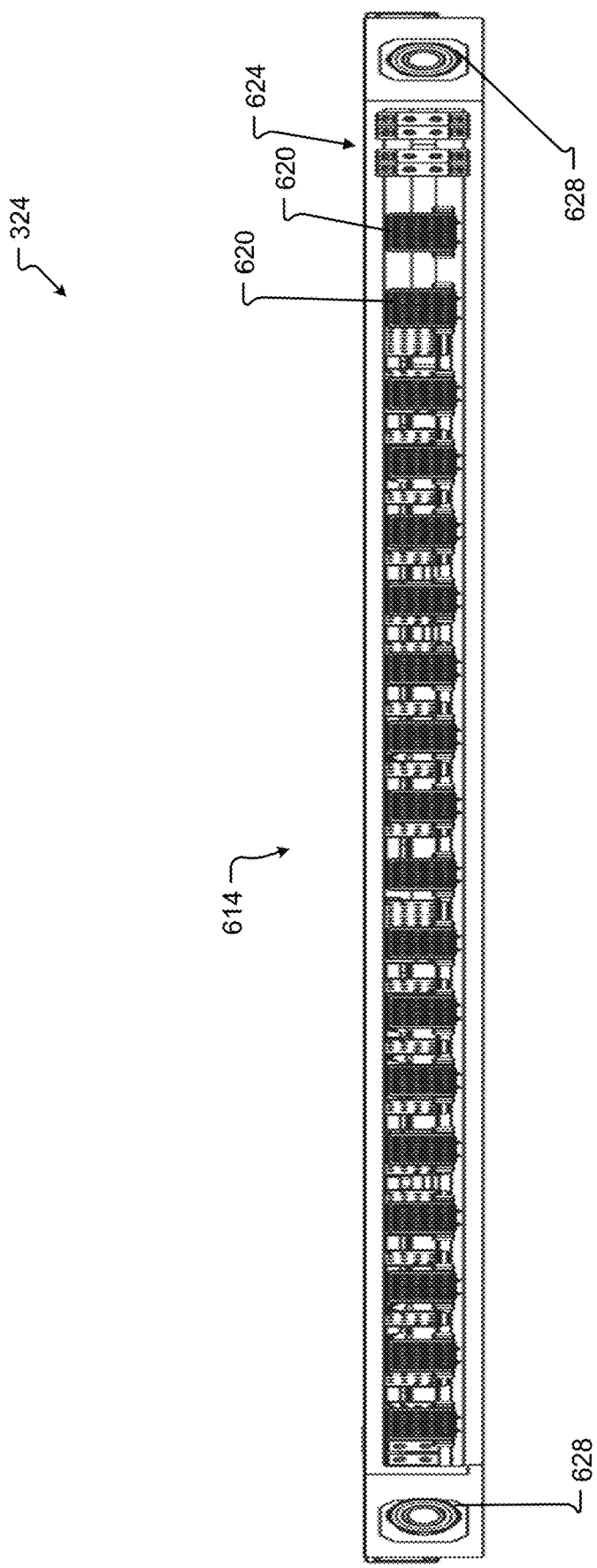
Figure 6E:
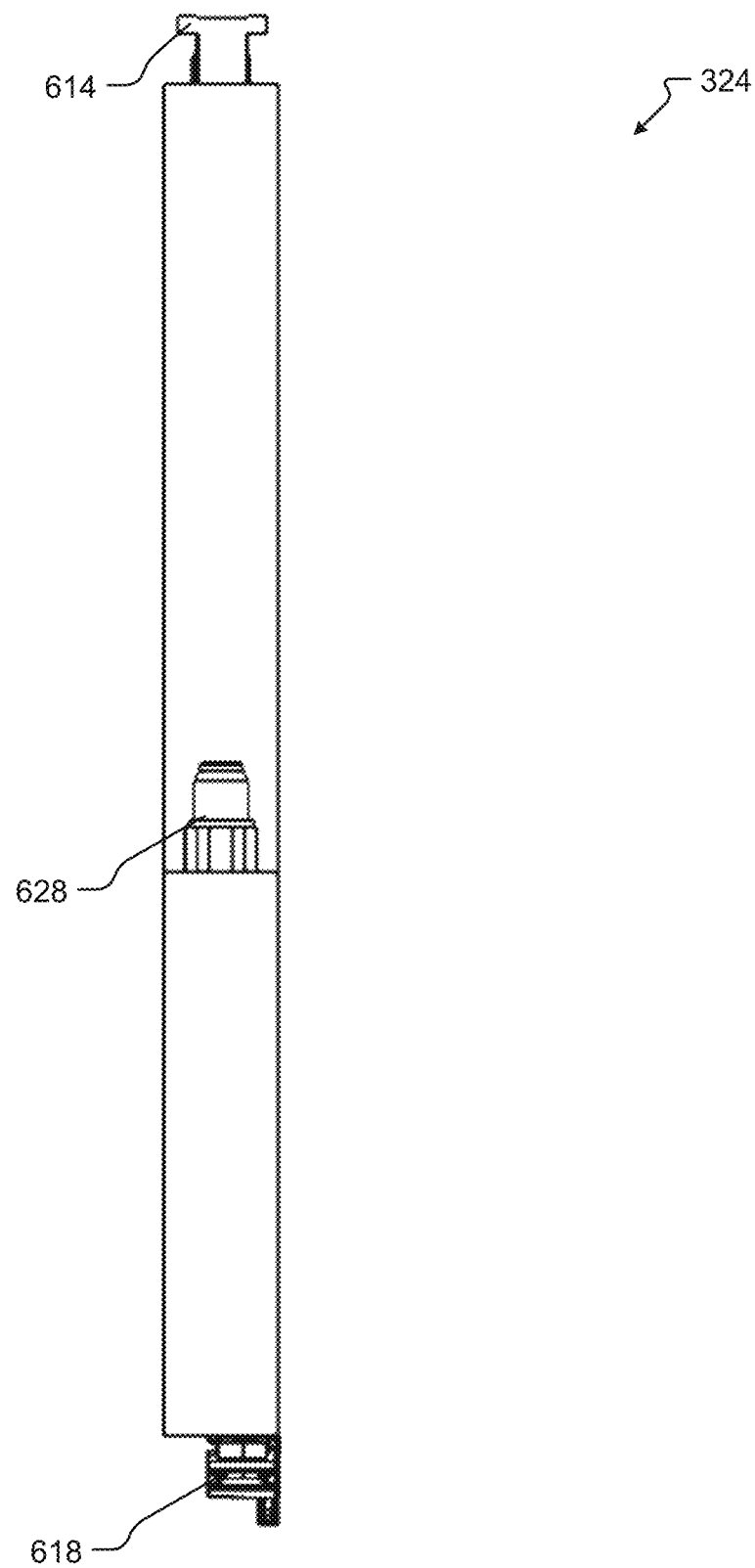
Figure 6F:
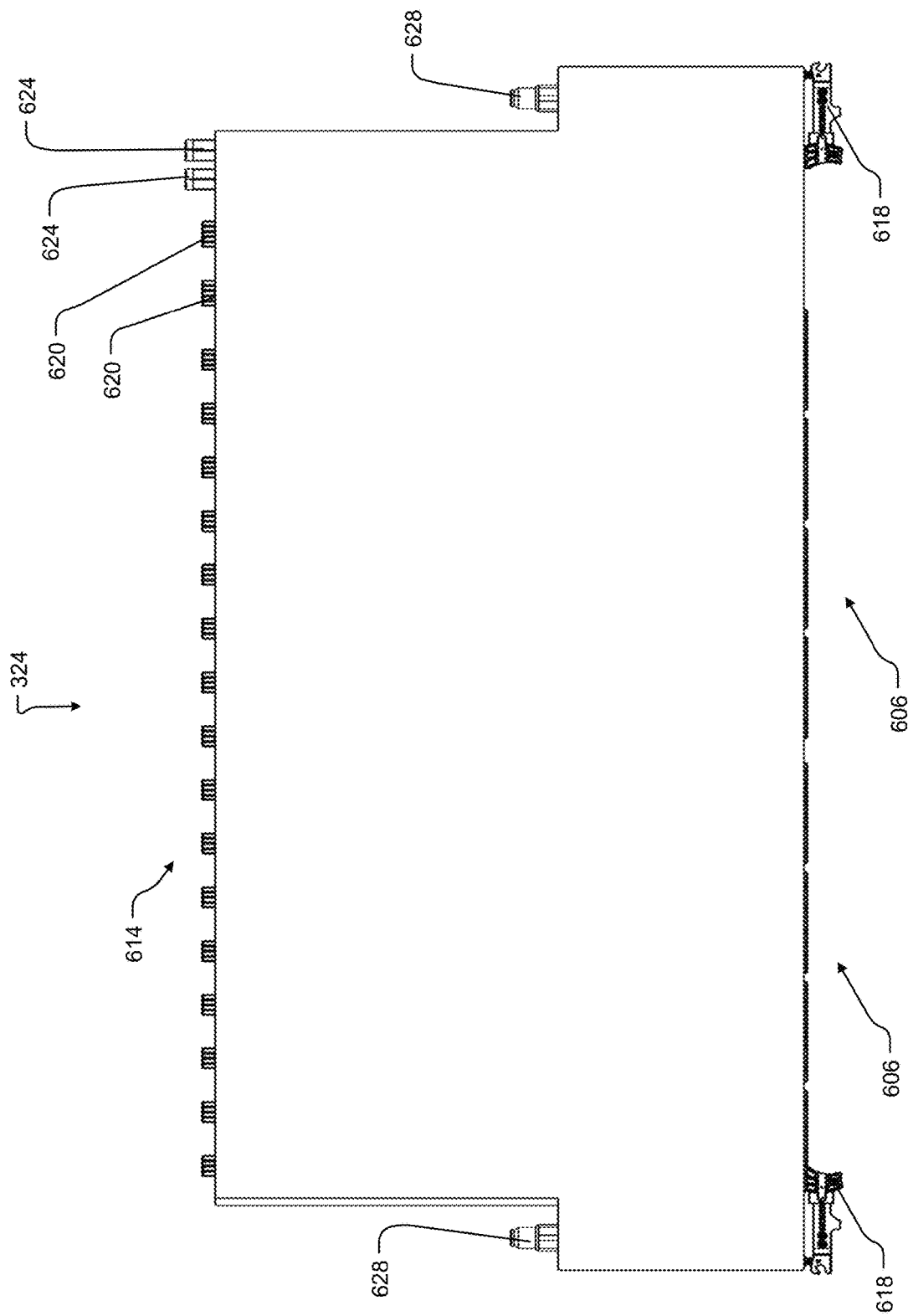
Figure 6G:
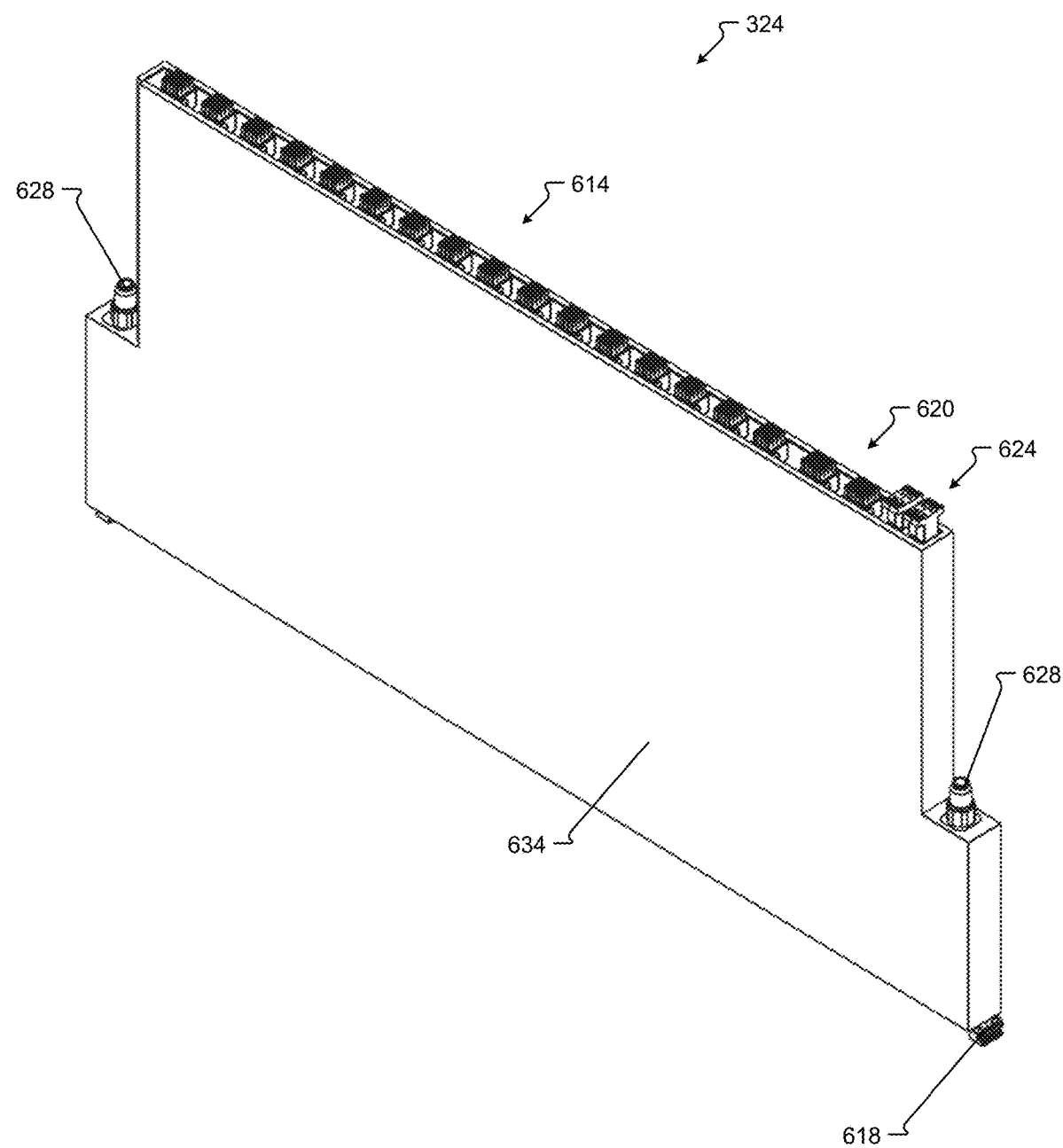

FIGS. 6A to 6G illustrate various views of a leaf switch 324 according to at least one example embodiment. In more detail, FIG. 6A illustrates a top view of a leaf switch 324, FIG. 6B illustrates a top perspective view of a leaf switch 324, FIGS. 6C and 6D illustrate side views of a leaf switch 324, FIG. 6E illustrates a side view of a leaf switch 324, FIG. 6F illustrates a back view of a leaf switch 324, and FIG. 6G illustrates a back perspective view of a leaf switch 324. For ease of illustration, it should be appreciated that some of the views in FIGS. 6A to 6G may exclude one or more elements shown in at least one other view.

With reference to FIGS. 6A to 6G, a leaf switch 324 includes a support board 600 that supports at least one switch 602, for example, two switches 602. The support board 600 may be comprised of the same or similar material as the support board 500 of a non-conductive substrate, such as a PCB or other suitable substrate. Like the switches 502, the switches 602 may include switching devices 604 mounted on a PCB or other suitable substrate. The switching devices 604 may be the same or similar switching devices as the switching devices 518 of the spine switch 320. In one non-limiting example, the switching devices 604 include electrical switching ASICs.

The switches 602 may further include input/output ports 616 that are connected to connectors 614 with, for example, electrical traces on the board 600 or other conductive wiring. That is, the substrate on which the switches 602 are mounted may further comprise connections that connect ports 616 of a switch 602 to the switching devices 604 of the switches 602. As described above for the spine switch 320, the connections may comprise conductive traces on PCBs of the switches 602 and/or waveguides on the PCB depending on whether the switching device 604 is an electrical switching ASIC that receives electrical signals over the conductive traces or an optical switch that receives optical signals over the waveguides.

A number of the ports 616 on each switch 602 may be equal to the number of connectors 614 so that each port 616 is connectable to a respective connector 614. In the illustrated example, there are 16 ports 616 for each witch 602 that connect to 16 connectors 614 which in turn connect to corresponding connectors 506 or 510 of 16 spine switches 320.

The switches 602 further include connectors 624 and 626 for providing power to the switches 602. For example, each connector 624 is connected to a connector 626 of a switch 602 with a cable (not shown) to provide power to the switches 602. The connectors 624 may connect with (e.g., blind mate) with a main power distribution tree in the rack 304 (not shown).

The leaf switch 324 further includes a first interface 606 at a first edge 608 of the support board 600. The first interface 606 connects to devices external to the network switch 300. FIGS. 6A to 6G illustrate two first interfaces 606 with four connectors each, where each connector has four lanes that connect to a switch 602. Thus, each set of interfaces 606 with four connectors each having four lanes serves 16 input/output ports for a switch 602. The first interfaces 606 may comprise one or more suitable connectors in a form factor suitable for connecting to the devices external to the network switch 300. The devices external to the network switch 300 may include additional network switches, servers, or other suitable networking element within the system 100. The first interfaces 606 may be connected to input/output ports of each switch 602.

The leaf switch 324 further includes a second interface 610 at a second edge 612 of the support board 600. The second edge 612 of the support board 600 is opposite the first edge 608 of the support board 600, and the second interface 610 may include a plurality of connectors 614. In accordance with at least one example embodiment, each connector 614 enables a detachable connection to a single spine switch 320 of a plurality of spine switches 320 of the network switch 300. For example, each connector 614 enables a detachable connection to a connector 506 or 510 of the spine switch 320 depending on which side of the spine switch 320 is connected to a leaf switch 324. A number of connectors 614 included on a leaf switch 324 may be equal to a maximum number of spine switches 320 included within the rack 304 so that each connector 614 is capable of connecting to a corresponding connector 506 or 510 on a spine switch 320.

In at least one embodiment, the support board 600 is mounted to or otherwise held in the rack 304 in a manner that enables easy removal of the board 600 from the rack 304. For example, in addition to the mechanical coupling between connectors 614 of the leaf switch 324 and connectors 506 or 510 of one or more spine switches 320, another mechanical coupling to the rack 304 may be achieved with mechanisms at the edge 608 of the board 600. For example, as clips 618 are located at the edge 608 and may engage with corresponding mechanisms on the rack 304 to enable a user to lock the board 600 into place within the rack 304. The clips 618 may be operated by a user to unlock the board 600 from the rack 304 to enable removal of the board 600 from the rack 304. Example embodiments are not limited to using clips 618 and other suitable mechanisms for manually locking and unlocking the board 600 may be used.

The leaf switch 324 further includes connectors 620 at the edge 612 of the board 600 at one end of the board 600. Each connector 620 may connect with a corresponding cable (not shown) that leads to one of the connectors 622 of a switch 602. The connectors 620 and 622 and cables may carry signals that provide a selected function for a respective switch 602. For example, the connectors 620 and 622 and the cables may provide management functions for a respective switch 602 to manage the leaf switch 324 with an internal and/or external server. Such management functions may include debug and/or testing operations for a switch 602 (e.g., the connectors 620 and 622 enable operation of each switch 602 as a standalone unit during manufacturing and assembly of a leaf switch 324 to run debugging operations and/or tests).

The leaf switch 324 also includes ports 628 located on opposite sides of the board 600 on protrusions 630 of the board 600. The ports 628 are connected to an internal cooling tube 632 and may further connect an external cooling tube. The cooling tube 632 is arranged on the support board 600 to provide cooling functions for the switches 602. For example, as shown in FIG. 6A, the cooling tube 632 passes over switching devices 604 to dissipate heat generated by the switching devices 604. One of the ports 628 serves as an inlet for coolant received from the external coolant tube while the other of the ports 628 serves as an outlet for 636 the coolant.

As shown in FIGS. 6B and 6C, for example, the interfaces 606 may be embedded in a sidewall surface 634 of the board 600 along edge 608. The sidewall surface 634 may extend around the entire perimeter of the leaf switch 324 such that the connectors 614, 620, and 624 and ports 628 penetrate the sidewall surface 634. Although not explicitly shown, it should be appreciated that the leaf switch 324 may include a cover that covers the components on the board 600. The cover may have substantially the same size and shape as the board 600.

As may be appreciated from FIG. 6G, for example, a back surface 636 of the board 600 is substantially planar.

Here, it should be appreciated that FIGS. 6A to 6G illustrate an example implementation of a leaf switch 324 and that various details of the leaf switch 324 may be altered according to design preferences. For example, the dimensions of elements, shapes of elements, and/or number elements (e.g., of connectors and input/output ports) described above as being associated with the leaf switch 324 may change depending on design preferences. For example, fewer or more switches 602 may be included. In general, though, a leaf switch 324 according to inventive concepts has a set of connectors 614 where each connector 614 connects a single corresponding connector of a spine switch 320. Like the spine switch 320, the leaf switch 324 is a field replaceable or customer replaceable unit in that the leaf switch 324 is easily detached from the connectors of the spine switches 320 and/or the rack 304.

In view of FIGS. 1 to 6G, at least one example embodiment is directed to an assembly for a network switch 300. The assembly includes a rack 304 and a spine section 308 including one or more spine switches 320. At least one of the one or more spine switches 320 includes a support board 500 that is attachable to the rack 304 and that supports at least one first switch 502, and a first set of connectors 506 at a first edge 508 of the support board 500 that detachably connect to one or more first leaf switches 324 to communicatively couple and decouple the at least one first switch 502 from the one or more first leaf switches 324.

The assembly may further include a first leaf section 312 including the one or more first leaf switches 324. Each first leaf switch 324 may include a plurality of connectors 614. As shown in FIG. 3, for example, each connector 614 in the plurality of connectors of each first leaf switch 324 detachably connects to a different spine switch in the one or more spine switches 320 through a connector 506 in the first set of connectors of each spine switch 320. Thus, when the one or more spine switches 320 are positioned in the rack 304 and are connected to the one or more first leaf switches 324, a longitudinal axis 328 of each spine switch 320 extends in a first direction and a longitudinal axis 332 of each first leaf switch 324 extends in a second direction that is substantially perpendicular to the first direction.

In at least one example embodiment, each support board 500 further comprises a second set of connectors 510 at a second edge 512 of the support board 500 that detachably connect to one or more second leaf switches 324 to communicatively couple and decouple the at least one first switch 502 from the one or more second leaf switches 324. Thus, the assembly may further include a second leaf section 316 including the one or more second leaf switches 324. Each second leaf switch 324 includes a plurality of connectors 614. Each connector 614 in the plurality of connectors of each second leaf switch 324 detachably connects to a different spine switch 320 in the one or more spine switches 320 through a connector 510 in the second set of connectors of each spine switch 320. Each support board 500 may further comprise a first movable support rail 532 having the first set of connectors 506 attached thereto and a second movable support rail 538 having the second set of connectors 510 attached thereto. As shown in FIG. 5A for example, each board 500 may include one or more flexible first cables that pass signals between the at least one first switch 502 and the first set of connectors 506 and one or more flexible second cables that pass signals between the at least one first switch 502 and the second set of connectors 510.

As may be appreciated from the above description, example embodiments provide field replaceable switches within a network switch, for example, a director switch, which reduces the costs and/or time of the maintenance effort that would otherwise involve powering down the entire network switch, disconnecting cables to remove the faulty element, installing a replacement element, and reconnecting cables before the network switch is operable again.

Although example embodiments have been shown and described with respect to systems having specific types of elements, numbers of elements, sizes elements, and/or shapes of elements, it should be appreciated inventive concepts are not limited thereto and that fewer, additional, and/or different types of elements, numbers of elements, sizes elements, and/or shapes of elements are within the scope of inventive concepts. In addition, the connectors described herein may be implemented as female and/or male connectors as desired.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiments, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

What is claimed is:

1. A spine switch for a network switch, the spine switch comprising:
   a support board that supports at least one first switch;
   a first set of connectors on a surface of the support board and at a first edge of the support board, wherein the first set of connectors detachably connect to one or more first leaf switches to communicatively couple and decouple the at least one first switch from the one or more first leaf switches; and
   a second set of connectors on the surface of the support board and at a second edge of the support board opposite the first edge, wherein the second set of connectors detachably connect to one or more second leaf switches to communicatively couple and decouple the at least one first switch from the one or more second leaf switches.

2. The spine switch of claim 1, wherein the support board is removable from the network switch.

3. The spine switch of claim 2, further comprising:
   a first rail arranged along the first edge of the support board and protruding from the surface of the support board, the first set of connectors being attached to the first rail, the first rail being movable to enable disconnection of the first set of connectors from the one or more first leaf switches and removal of the support board from the network switch.

4. The spine switch of claim 3, further comprising:
   at least one mechanism that causes movement of the first rail.

5. The spine switch of claim 3, wherein the at least one mechanism comprises:
   a jack mechanism on the support board and that mechanically couples to the first rail.

6. The spine switch of claim 5, wherein the at least one mechanism comprises:
   a rod that mechanically couples to the jack mechanism and that causes movement of the jack mechanism upon rotation of the rod.

7. The spine switch of claim 6, wherein, upon coupling the rod to the jack mechanism, the rod extends to a third edge of the support board, the third edge of the support board extending in a different direction than the first edge of the support board.

8. The spine switch of claim 7, wherein an end of the rod at the third edge of the support board enables mechanical coupling to a tool used to rotate the rod.

9. The spine switch of claim 3, further comprising:
   one or more flexible cables that pass signals between the first set of connectors and the at least one first switch.

10. The spine switch of claim 9, wherein the one or more flexible cables have lengths that enable movement of the first rail without disconnecting the one or more flexible cables from the first set of connectors and the at least one first switch.

11. The spine switch of claim 3, further comprising:
    a second rail arranged along the second edge of the support board and protruding from the surface of the support board, the second set of connectors being attached to the second rail, the second rail being movable to enable disconnection of the second set of connectors from the one or more second leaf switches and removal of the support board from the network switch.

12. The spine switch of claim 11, wherein the at least one mechanism comprises a first mechanism that moves the first rail and a second mechanism that moves the second rail.

13. The spine switch of claim 1, wherein the at least one switch is mounted on the surface of the support board.

14. The spine switch of claim 1, wherein a number of the first set of connectors, a number of the second set of connectors, and a number of ports of the at least one first switch are such that the spine switch is non-blocking.

15. An assembly for a network switch, comprising:
a rack; and
a spine section including one or more spine switches, at least one of the one or more spine switches including:
   a support board that is attachable to the rack and that supports at least one first switch; and
   a first set of connectors at a first edge of the support board that detachably connect to one or more first leaf switches to communicatively couple and decouple the at least one first switch from the one or more first leaf switches, wherein, when the one or more spine switches are positioned in the rack and are connected to the one or more first leaf switches, a longitudinal axis of each spine switch extends in a first direction and a longitudinal axis of each first leaf switch extends in a second direction that is substantially perpendicular to the first direction.

16. The assembly of claim 15, further comprising:
a first leaf section including the one or more first leaf switches, each first leaf switch including a plurality of connectors, wherein each connector in the plurality of connectors of each first leaf switch detachably connects to a different spine switch in the one or more spine switches through a connector in the first set of connectors of each spine switch.

17. The assembly of claim 16, wherein each support board further comprises a second set of connectors at a second edge of the support board that detachably connect to one or more second leaf switches to communicatively couple and decouple the at least one first switch from the one or more second leaf switches.

18. The assembly of claim 17, further comprising:
a second leaf section including the one or more second leaf switches, each second leaf switch including a plurality of connectors, wherein each connector in the plurality of connectors of each second leaf switch detachably connects to a different spine switch in the one or more spine switches through a connector in the second set of connectors of each spine switch, wherein each support board further comprises:
   a first movable support rail having the first set of connectors attached thereto;
   a second movable support rail having the second set of connectors attached thereto;
   one or more flexible first cables that pass signals between the at least one first switch and the first set of connectors; and
   one or more flexible second cables that pass signals between the at least one first switch and the second set of connectors.

19. The assembly of claim 15, wherein, each support board includes two surfaces stepped back from a main surface, and wherein the two surfaces contact respective mounting rails of the rack when positioned in the rack.

20. A leaf switch for a network switch, the leaf switch comprising:
a support board including a planar surface on which at least one switch is mounted;
a first interface on the planar surface of the support board and at a first edge of the support board, wherein the first interface connects to devices external to the network switch; and
a second interface on the planar surface of the support board and at a second edge of the support board, wherein the second interface includes a plurality of connectors on the planar surface of the support board, each connector enabling a detachable connection to a single spine switch of a plurality of spine switches of the network switch, and wherein the second edge of the support board is opposite the first edge of the support board.

* * * * *